(12) United States Patent
Sato et al.

(10) Patent No.: US 7,628,729 B2
(45) Date of Patent: Dec. 8, 2009

(54) HYDRAULIC CONTROL APPARATUS FOR AN AUTOMATIC TRANSMISSION

(75) Inventors: Nobuhiro Sato, Anjo (JP); Tetsuya Yamaguchi, Anjo (JP); Kazuyuki Noda, Handa (JP); Akira Fukatsu, Anjo (JP); Mikio Iwase, Anjo (JP); Kazutoshi Nozaki, Aichi-ken (JP); Atsushi Honda, Seto (JP)

(73) Assignees: Aisin AW Co., Ltd., Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 376 days.

(21) Appl. No.: 11/643,782

(22) Filed: Dec. 22, 2006

(65) Prior Publication Data

US 2007/0167283 A1 Jul. 19, 2007

(30) Foreign Application Priority Data

Dec. 28, 2005 (JP) ............................. 2005-378389
Dec. 28, 2005 (JP) ............................. 2005-378390
Dec. 28, 2005 (JP) ............................. 2005-378391

(51) Int. Cl.
    *F16H 61/26* (2006.01)
(52) U.S. Cl. .................... 477/127; 477/906; 475/123
(58) Field of Classification Search ............... 475/122, 475/123, 128; 477/906, 127, 131
See application file for complete search history.

(56) References Cited

U.S. PATENT DOCUMENTS 4,351,206 A * 9/1982 Lemieux et al. .............. 477/134
5,749,802 A * 5/1998 Tanahashi et al. ............ 475/120
6,319,165 B1 * 11/2001 Itou et al. .................... 475/119
6,475,113 B2 * 11/2002 Suzuki et al. ................. 477/127
6,478,707 B1 * 11/2002 Jang ........................... 475/119
2003/0040389 A1 * 2/2003 Kim et al. .................... 475/128

FOREIGN PATENT DOCUMENTS

| JP | 8-42681 A | 2/1996 |
| JP | 09-014425 A | 1/1997 |
| JP | 09-014430 A | 1/1997 |
| JP | 09-303547 A | 11/1997 |

OTHER PUBLICATIONS

PCT International Search Report (PCT/JP 2006/321210).

* cited by examiner

*Primary Examiner*—Rodney H Bonck
*Assistant Examiner*—Justin Holmes
(74) *Attorney, Agent, or Firm*—Sughrue Mion, PLLC

(57) ABSTRACT

A hydraulic control apparatus, provided with a manual shift valve that outputs a forward range pressure and a reverse range pressure, and a linear solenoid valve that outputs an engagement pressure to the hydraulic servo that engages during reverse travel when energized, includes a fourth clutch relay valve that is interposed between the linear solenoid valve and the hydraulic servo. The fourth clutch relay valve communicates an engagement pressure of the linear solenoid valve to the hydraulic servo by locking in the normal position when a signal pressure of the solenoid valve is input, and communicates a reverse range pressure to the hydraulic servo by being switched to a fail position by the reverse range pressure during a failure in which the fourth clutch relay valve is de-energized. Thereby, it is possible to establish a reverse speed during a failure in which the solenoid valve is de-energized.

6 Claims, 7 Drawing Sheets

FIG. 2

| POSITION | | SOLENOID | | | | | | | | | CLUTCH | | | | BRAKE | | OWC |
|---|---|---|---|---|---|---|---|---|---|---|---|---|---|---|---|---|---|
| | | SL1 | SL2 | SL3 | SL4 | SL5 | SR | SL | SLU | C-1 | C-2 | C-3 | C-4 | B-1 | B-2 | F-1 |
| P | | ○ | × | × | × | × | ○ | × | × | × | × | × | × | × | × | × |
| R | REV1 | × | ○ | ○ | × | × | ○ | ○ | × | × | × | ○ | × | × | ○ | × |
| | REV2 | × | ○ | × | ○ | × | ○ | ○ | × | × | × | ○ | ○ | ○ | ○ | × |
| | R PROHIBITED | × | ○ | × | × | × | ○ | ○ | × | × | × | ○ | × | × | × | × |
| | N | ○ | × | × | × | × | ○ | × | × | × | × | × | × | × | × | × |
| D | 1ST | ○ | × | × | × | × | ○ | × | × | ○ | × | × | × | × | × | ○ |
| | E/G BRAKE | ○ | × | × | × | ○ | × | ◎ | × | ○ | × | × | × | ○ | × | ○ |
| | 2ND | ○ | × | × | × | ○ | ○ | × | ○ | ○ | × | × | × | ○ | × | × |
| | N cont. | △ | × | ○ | × | × | × | ◎ | ○ | △ | × | × | × | × | × | ○ |
| | 3RD | ○ | × | ○ | × | × | ○ | ◎ | × | ○ | × | ○ | × | × | × | × |
| | 4TH | ○ | × | × | ○ | × | ○ | ◎ | × | ○ | × | × | ○ | × | × | × |
| | 5TH | × | ○ | × | × | × | ○ | ◎ | × | ○ | ○ | × | × | × | × | × |
| | 6TH | × | ○ | × | ○ | × | ○ | ◎ | × | × | ○ | × | ○ | × | × | × |
| | OD1 | × | ○ | × | × | ○ | ○ | ◎ | × | × | ○ | ○ | × | × | × | × |
| | OD2 | × | × | ○ | × | ○ | ○ | ○ | × | × | × | ○ | ○ | × | × | × |
| IMMEDIATELY AFTER E/G START-UP | | ○ | × | × | × | × | ○ | × | × | × | × | × | × | × | × | × |
| P,N | | × | × | × | × | × | × | × | × | × | × | × | × | × | × | × |
| R | R:REV2 | × | × | × | × | × | × | × | × | × | × | ○ | ○ | × | ○ | × |
| D | OD1 | × | × | × | × | × | × | × | × | × | ○ | ○ | × | × | × | × |
| | 3RD (AFTER 1G OFF) | × | × | × | × | × | × | × | × | ○ | × | ○ | × | × | × | × |

REMARKS: 
○ ON  
× OFF  
◎ ON: L-UP ON  OFF: L-UP OFF  
△ CONTROLLED

APPLIED  
RELEASE  
CONTROL

HYDRAULIC CONTROL APPARATUS FOR AN AUTOMATIC TRANSMISSION

INCORPORATION BY REFERENCE

This application claims priority from Japanese Patent Application Nos. 2005-378391, 2005-378389, and 2005-378390, all filed on Dec. 28, 2005, the disclosures of which, including the specifications, drawings and abstracts, are incorporated herein by reference in their entirety.

BACKGROUND OF THE INVENTION

1. Field of the Invention

The present invention relates to a hydraulic control apparatus for an automatic transmission that is mounted, for example, in a vehicle, and in particular, relates to a hydraulic control apparatus for an automatic transmission that establishes a reverse speed by outputting an engagement pressure to the hydraulic servo of a friction engagement element by a solenoid valve that is energized when traveling in reverse during normal operation.

2. Description of the Related Art

Conventionally, a staged automatic transmission that is mounted, for example, in a vehicle, enables establishing each shift speed during forward travel and a reverse speed by controlling the engagement state of a plurality of friction engagement elements (clutches and brakes) by using a hydraulic control apparatus and establishing a transmission path in the speed change mechanism for each shift speed. In such a hydraulic control apparatus, a plurality of solenoid valves are provided that regulate and output engagement pressures to respective hydraulic servos that releasably engage the plurality of friction engagement elements, and the control of the multi-stage shifting described above is carried out by engaging the friction engagement elements necessary to establish the shift speeds by using the electronic control of these solenoid valves (refer, for example, to Japanese Patent Application Publication No. JP-A-8-42681).

However, in the hydraulic control apparatus described above, in order to prevent the friction engagement elements from unintentionally engaging when, for example, a failure (damage) occurs, or in order to suppress electrical consumption during travel, preferably a normally closed type valve, which does not output oil pressure when not energized, is used for the solenoid valves described above. Thus, during normal operation in such a hydraulic control apparatus, when the shift range is changed to the forward range or the reverse range based on the operation of the shift lever, the necessary solenoid valves are energized and engagement pressures are supplied to the hydraulic servos of the friction engagement elements that engage in the forward shift speeds or the reverse shift speed, respectively.

However, in the hydraulic control apparatus described above, when the solenoid valves that are necessary for establishing the reverse speed remain de-energized due to, for example, some sort of failure, there is a problem in that the reverse speed is not established, that is, the reverse travel of the vehicle becomes impossible.

In such fail states in which the solenoid valves that are necessary for reverse speed are not energized, the following cases can be considered: the case in which a sensor that detects, for example, the shift range, fails, the shift range cannot be detected, and whether any of the solenoid valves should be energized cannot be determined, and the case in which, for example, a severed wire or short occurs and an all-solenoids-off failure mode is set. In this all-solenoids-off failure mode, all of the solenoid valves are de-energized in order to prevent the friction engagement elements from engaging unintentionally when any sort of failure has been detected.

SUMMARY OF THE INVENTION

Thus, one object of the present invention to provide a hydraulic control apparatus for an automatic transmission that enables establishing a reverse speed by switching a range switching valve to a reverse range position even when the solenoid valves that should be energized during reverse travel are de-energized.

According to a first aspect of the present invention, the first switching valve communicates a first engagement pressure to the first hydraulic servo by being locked in the normal position when the signal pressure of the signal pressure output solenoid valve is output, and even during a failure in which the first engagement pressure control solenoid valve and the signal pressure output solenoid valve are de-energized, when the range switching valve is switched to the reverse range position, the reverse range pressure is communicated to the first hydraulic servo by switching to the fail position due to the reverse range pressure. Thus, during normal operation, it is possible to establish smoothly the reverse speed by supplying the first engagement pressure, which is output from the first engagement pressure control solenoid valve, to the first hydraulic servo, and even during a failure, it is possible to establish the reverse speed by supplying the reverse range pressure to the first hydraulic servo, and thus the vehicle can travel in reverse even during a failure.

According to a second aspect of the present invention, the first switching valve includes a spool that is switched between a normal position and a fail position, an urging device that urges the spool toward the normal position, a first oil chamber in which the signal pressure of the signal pressure output solenoid valve acts on the spool in the direction of the normal position, and a second oil chamber in which the reverse range pressure acts on the spool in the direction of the fail position. Thus, the first switching valve is locked in the normal position when the signal pressure of the signal pressure output solenoid valve is output, and even during a failure, it is possible to switch the first switching valve to the fail position due to the reverse range pressure.

According to a third aspect of the present invention, because a second switching valve is provided that is switched from a first position to a second position when the signal pressure of the signal pressure output solenoid valve is output, and is locked in the first position when the reverse range pressure is input, while hydraulic control that uses the signal pressure output solenoid valve in the reverse range is enabled, it is possible to output the signal pressure of the signal pressure output solenoid valve in the reverse range in order to establish the reverse speed.

According to a fourth aspect of the present invention, because the second switching valve is a valve that outputs a lock-up clutch engagement pressure in order to engage the lock-up clutch in the second position, in the forward range, it is possible to carry out hydraulic control of the lock-up clutch by using the signal pressure output solenoid valve.

According to a fifth aspect of the present invention, during a failure in which the range position of the range switching valve is not detected by the range position detecting device, forward start control, in which the second engagement pressure control solenoid valve is energized, is carried out, and thus when the range switching valve is in the reverse range position, the forward speed is established, and it is possible for the vehicle to travel forward. In addition, when the range switching valve is in the reverse range position, while the second engagement pressure is not output from the second engagement pressure control solenoid valve when the reverse range pressure is not output and the establishment of the forward speed could be obstructed, the first switching valve is switched to the fail position by the reverse range pressure, it is possible to establish the reverse speed by supplying the reverse range pressure to the first hydraulic servo, and it is possible for the vehicle to travel in reverse.

BRIEF DESCRIPTION OF THE DRAWINGS

FIG. 2 is an operating table for an exemplary embodiment of the present automatic transmission;

DETAILED DESCRIPTION OF THE PREFERRED EMBODIMENTS

Below, exemplary embodiments of the present invention will be explained with reference to FIG. 1 through FIG. 7.

Configuration of Automatic Transmission

Figure 1:
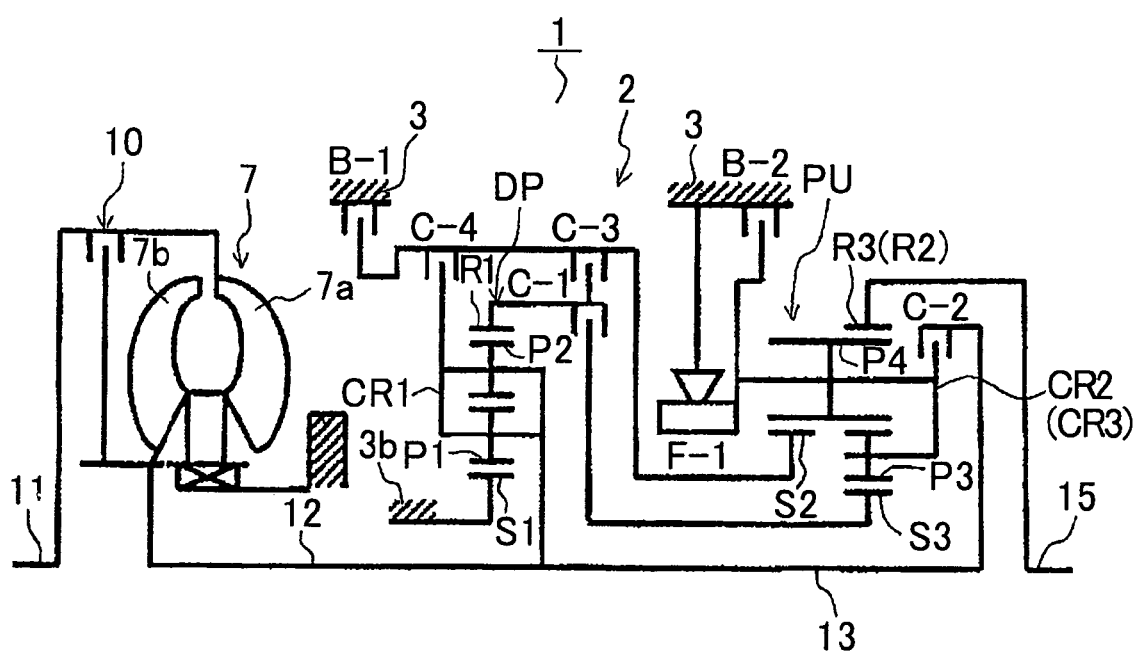
FIG. 1 is a skeleton drawing showing the automatic transmission that can be used in an exemplary embodiment of the present invention.

First, a schematic structure of the staged automatic transmission (below, referred to simply as an "automatic transmission") in which an exemplary embodiment of the present invention can be applied will be explained with reference to FIG. 1. As shown in FIG. 1, a preferable automatic transmission 1 that is used, for example, in an FR type (front engine, rear drive) vehicle has an input shaft 11 for the automatic transmission 1 that is able to connect to an engine (not illustrated), and is provided with a torque converter 7 that is disposed concentrically with the input shaft 11 in the axial direction and a speed change mechanism 2.

The torque converter 7 has a pump impeller 7a that is connected to the input shaft 11 of the automatic transmission 1 and a turbine runner 7b to which the rotation of the pump impeller 7a is transmitted via a working liquid. The turbine runner 7b is connected to the input shaft 12 of the speed change mechanism 2 disposed coaxially to the input shaft 11. In addition, the torque converter 7 is provided with a lock-up clutch 10, and when the lock-up clutch 10 is engaged by the hydraulic control of the hydraulic control apparatus described below, the rotation of the input shaft 11 of the automatic transmission 1 described above is directly transmitted to the input shaft 12 of the speed change mechanism 2.

This speed change mechanism 2 is provided with a planetary gear DP and a planetary gear unit PU on the input shaft 12 (and the intermediate shaft 13). This planetary gear DP is provided with a sun gear S1, a carrier CR1, and a ring gear R1. In the carrier CR1, a pinion P1 that meshes with the sun gear S1 and a pinion P2 that meshes with the ring gear R1 mesh together to form what is referred to as a double pinion planetary gear.

In addition, the planetary gear unit PU has four rotating elements: a sun gear S2, a sun gear S3, a carrier CR2 (CR3), and a ring gear R3 (R2), and in the carrier CR2, a long pinion P4 that meshes with the sun gear S2 and a ring gear R3 and a short pinion P3 that meshes with the long pinion P4 and the sun gear S3 mesh together to form what is referred to as a Ravigneaux-type planetary gear.

The rotation of the sun gear S1 of the planetary gear DP described above is held stationary by being connected to a boss portion 3b that is integrally attached, for example, to the transmission case 3. In addition, the carrier CR1 described above is connected to the input shaft 12 to rotate together with the rotation of the input shaft 12 (below, referred to as "input rotation"), and at the same time is connected to the fourth clutch C-4 (first friction engagement element). Furthermore, the ring gear R1 provides a reduced rotation in which the input rotation is reduced due to the stationary sun gear S1 and the carrier CR1 that provides the input rotation, and at the same time is moconnected to a first clutch C-1 (second friction engagement element) and a third clutch C-3 (a friction engagement element).

The sun gear S2 of the planetary gear unit PU described above is able to fasten freely to the transmission case 3 by connecting to the first brake B-1 (a friction engagement element), which serves as a locking device, and at the same time, connects to the fourth clutch C-4 and the third clutch C-3. The input rotation of the carrier CR1 via the fourth clutch C-4 and the reduced rotation of the ring gear R1 via the third clutch C-3 can each be freely and separately input. In addition, the sun gear S3 is connected to the first clutch C-1 and the reduced rotation of the ring gear R1 can be freely input.

Furthermore, the carrier CR2 is connected to the second clutch C-2 (a friction engagement element), to which the rotation of the input shaft 12 is input via the intermediate shaft 13, and the input rotation can be freely input via the second clutch C-2. In addition, the carrier CR2 is connected to the one-way clutch F-1 and the second brake B-2 (a friction engagement element), which serve as locking devices, the one-way clutch F-1 restricts the rotation in one direction with respect to the transmission case 3, and the rotation can be held stationary or permitted by the second brake B-2. In addition, the ring gear R3 is connected to the output shaft 15, which outputs a rotation to the vehicle's driven wheels (not illustrated).

Transmission Path of Each Shift Speed

Figure 3:
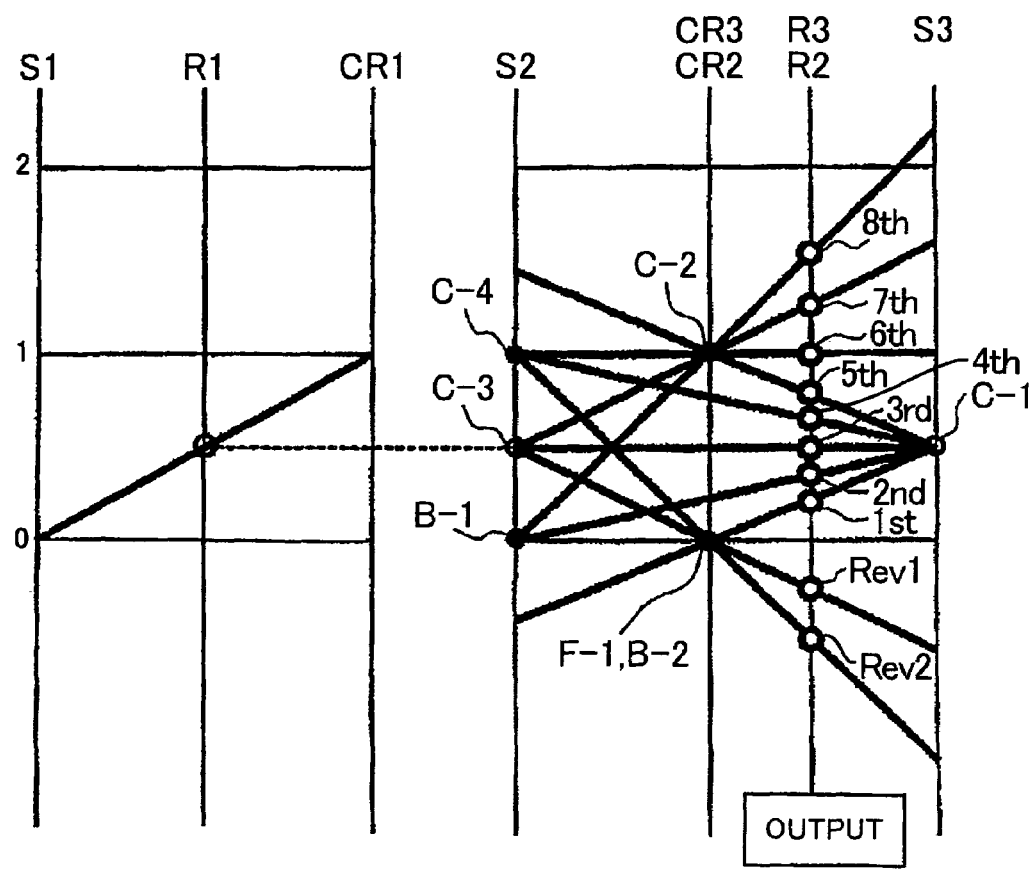
FIG. 3 is a velocity diagram for an exemplary embodiment of the present automatic transmission.

Next, based on the configuration described above, the operation of the speed change mechanism 2 will be explained with reference to FIG. 1, FIG. 2, and FIG. 3. Note that in the velocity diagram shown in FIG. 3, the vertical axes show the rotation of the respective rotation elements (each gear), and the horizontal axes show the correspondence with the gear ratios of these rotation elements. In addition, in the part of the velocity diagrams showing the planetary gear DP, the vertical axis that is the closest to the end in the transverse direction (the left side in FIG. 3) corresponds to the sun gear S1 and the vertical axes in sequence towards the right side of the figure correspond to the ring gear R1 and the carrier CR1. Furthermore, in the part of the velocity diagram showing the planetary gear unit PU, the vertical axis that is closest to the end in the transverse direction (the right side in FIG. 3) corresponds to the sun gear S3, and the vertical axes in sequence towards the left side of the figure correspond to the ring gear R3 (R2), the carrier CR2 (CR3), and the sun gear S2.

In the D (drive) range, for example, while being driven by the engine (drive source) in the first forward speed (1st), as shown in FIG. 2, the first clutch C-1 and the one-way clutch F-1 are engaged. Thus, as shown in FIG. 1 and FIG. 3, the rotation of the ring gear R1, whose rotation is reduced by the stationary sun gear S1 and by the carrier CR1, which is the input rotation, is input to the sun gear S3 via the first clutch C-1. In addition, the rotation of the carrier CR2 is restricted to one direction (the normal rotation direction), or specifically, the rotation of the carrier CR2 is held stationary by preventing the reverse rotation of the carrier CR2. Thus, the reduced rotation input to the sun gear S3 is output to the ring gear R3 via the stationary carrier CR2, and a normal rotation is output from the output shaft 15 as the first forward speed.

Note that while not driving in the first forward speed (1st), specifically, during engine braking (during coasting), the carrier CR2 is held stationary by being locked by the second brake B-2, and thus the normal rotation of the carrier CR2 is prevented. Thereby, the state of the first forward speed is maintained. In addition, while driving in the first forward speed, because the reverse rotation of the carrier CR2 is prevented by the one-way clutch F-1 and normal rotation is possible, attaining the first forward speed when, for example, switching from a non-traveling range to a traveling range, can be carried out smoothly by the automatic engagement of the one-way clutch F-1.

In the second forward speed (2nd), as shown in FIG. 2, the first clutch C-1 is engaged, and the first brake B-1 is locked. Thus, as shown in FIG. 1 and FIG. 3, the rotation of the ring gear R1, whose rotation is reduced by the stationary sun gear S1 and by the carrier CR1, which is the input rotation, is input to the sun gear S3 via the first clutch C-1. In addition, the rotation of the sun gear S2 is held stationary by the locking of the first brake B-1. Thus, the carrier CR2 acquires a reduced rotation that is lower than that of the sun gear S3, the reduced rotation that is input to the sun gear S3 is then input to the ring gear R3 via the carrier CR2, and the normal rotation is output from the output shaft 15 as the second forward speed.

In the third forward speed (3rd), as shown in FIG. 2, the first clutch C-1 and the third clutch C-3 are engaged. Thus, as shown in FIG. 1 and FIG. 3, the rotation of the ring gear R1, whose rotation is reduced by the stationary sun gear S1 and by the carrier CR1, which is the input rotation, is input to the sun gear S3 via the first clutch C-1. In addition, the reduced rotation of the ring gear R1 is input to the sun gear S2 by the engagement of the third clutch C-3. That is, because the reduced rotation of the ring gear R1 is input to the sun gear S2 and the sun gear S3, the planetary gear unit PU becomes directly linked to the reduced rotation, the reduced rotation is input directly into the ring gear R3, and the normal rotation is output from the output shaft 15 as the third forward speed.

In the fourth forward speed (4th), as shown in FIG. 2, the first clutch C-1 and the fourth clutch C-4 are engaged. Thus, as shown in FIG. 1 and FIG. 3, the rotation of the ring gear R1, whose rotation is reduced by the stationary sun gear S1 and by the carrier CR1, which is the input rotation, is input to the sun gear S3 via the first clutch C-1. In addition, the input rotation of the carrier CR1 is input to the sun gear S2 due to the engagement with the fourth clutch C-4. Thus, the carrier CR2 acquires a reduced rotation that is higher than that of the sun gear S3, the reduced rotation that is input by the sun gear S3 is then output to the ring gear R3 via the carrier CR2, and the normal rotation is output from the output shaft 15 as the fourth forward speed.

In the fifth forward speed (5th), as shown in FIG. 2, the first clutch C-1 and the second clutch C-2 are engaged. Thus, as shown in FIG. 1 and FIG. 3, the rotation of the ring gear R1, whose rotation is reduced by the stationary sun gear S1 and by the carrier CR1, which is the input rotation, is input to the sun gear S3 via the first clutch C-1. In addition, the input rotation is input to the carrier CR2 due to the engagement with the second clutch C-2. Thus, a reduced rotation that is higher than that of the fourth forward speed described above due to the reduced rotation input to the sun gear S2 and the input rotation input to the carrier CR2, is output to the ring gear R3, and the normal rotation is output from the output shaft 15 as the fifth forward speed.

In the sixth forward speed (6th), as shown in FIG. 2, the second clutch C-2 and the fourth clutch C-4 are engaged. Thus, as shown in FIG. 1 and FIG. 3, the input rotation of the carrier CR1 is input to the sun gear S2 due to the engagement with the fourth clutch C-4. In addition, the input rotation of the carrier CR2 is input due to the engagement with the second clutch C-2. That is, because the input rotation is input to the sun gear S2 and to the carrier CR2, the planetary gear unit PU is coupled directly to the input rotation, the input rotation is output directly to the ring gear R3, and the normal rotation is output from the output shaft 15 as the sixth forward speed.

In the seventh forward speed (7th, OD1), as shown in FIG. 2, the second clutch C-2 and the third clutch C-3 are engaged. Thus, as shown in FIG. 1 and FIG. 3, the rotation of the ring gear R1, whose rotation is reduced by the stationary sun gear S1 and by the carrier CR1, which is the input rotation, is input to the sun gear S2 via the third clutch C-3. In addition, the input rotation is input to the carrier CR2 due to the engagement with the second clutch C-2 via the third clutch C-3. Thus, an increased rotation that is slightly higher than the input rotation due to the reduced rotation that is input to the sun gear S2 and the input rotation that is input to the carrier CR2 is output to the ring gear R3, and the normal rotation is output from the output shaft 15 as the seventh forward speed (the first overdrive speed, which is faster than the directly coupled speed).

In the eighth forward speed (8th, OD2), as shown in FIG. 2, the second clutch C-2 is engaged, and the first brake B-1 is locked. Thus, as shown in FIG. 1 and FIG. 3, the input rotation is input to the carrier CR2 due to the engagement with the second clutch C-2. In addition, the rotation of the sun gear S2 is held stationary due to the locking of the first brake B-1. Thus, the input rotation of the carrier CR2 by the stationary sun gear S2 becomes an increased rotation that is higher than that of the seventh forward speed described above, this rotation is input to the ring gear R3, and the normal rotation is output from the output shaft 15 as the eighth forward speed (the second overdrive speed), which is faster than the directly coupling speed.

In the first reverse speed (Rev1), as shown in FIG. 2, the third clutch C-3 is engaged, and the second brake B-2 is locked. Thus, as shown in FIG. 1 and FIG. 3, the rotation of the ring gear R1, whose rotation is reduced by the stationary sun gear S1 and by the carrier CR1, which is the input rotation, is input to the sun gear S2 via the third clutch C-3. In addition, the rotation of the carrier CR2 is held stationary by being locked by the second brake B-2. Thus, the reduced rotation that is input to the sun gear S3 is output to the ring gear R3 via the stationary carrier CR2, and the reverse rotation is output from the output shaft 15 as the first reverse speed.

In the second reverse speed (Rev2), as shown in FIG. 2, the fourth clutch C-4 is engaged, and the second brake B-2 is locked. Thus, as shown in FIG. 1 and FIG. 3, the input rotation of the carrier CR1 due to the engagement with the clutch C-4 is input to the sun gear S2. In addition, the rotation of the carrier CR2 is held stationary by being locked by the second brake B-2. Thus, the input rotation that is input to the sun gear S2 is output to the ring gear R3 via the stationary carrier CR2, and the reverse rotation is output from the output shaft 15 as the second reverse speed.

Note that in an exemplary embodiment of the present automatic transmission, the fourth clutch C-4 and the second brake B-2 are engaged while in the reverse range due to the hydraulic control by the hydraulic control apparatus 20 that will be described in detail below, and thus, only a second reverse speed is established. However, this can be modified in various manners, and only a first reverse speed or both a first reverse speed and a second reverse speed may be established.

In addition, in the P (parking) range and the N (neutral) range, the first clutch C-1, the second clutch C-2, the third clutch C-3, and the fourth clutch C-4 are released. Thereby, the carrier CR1 and the sun gear S2 are disengaged. In addition, the ring gear R1, the sun gear S2, and the sun gear S3 are disengaged, and thereby the planetary gear DP and the planetary gear unit PU are disengaged. Additionally, the input shaft 12 (intermediate shaft 13) and the carrier CR2 are disengaged. Thereby, the transfer of the driving force between the input shaft 12 and the planetary gear unit PU is disengaged, and thus, the transfer of the driving force between the input shaft 12 and the output shaft 15 is disengaged.

Overall Configuration of Hydraulic Control Apparatus

Next, the hydraulic control apparatus 20 of the automatic transmission according to an exemplary embodiment of the present invention will be explained. First, the overall hydraulic control apparatus 20 will be broadly explained with reference to FIG. 4. Note that in the present exemplary embodiment, there is one spool in each valve, and in order to explain the spool's switching position and the control position, the state in the right half portion shown in FIG. 4 through FIG. 7 is referred to as the "right half position" and the state in the left half portion shown therein is referred to as the "left half position".

Figure 4:
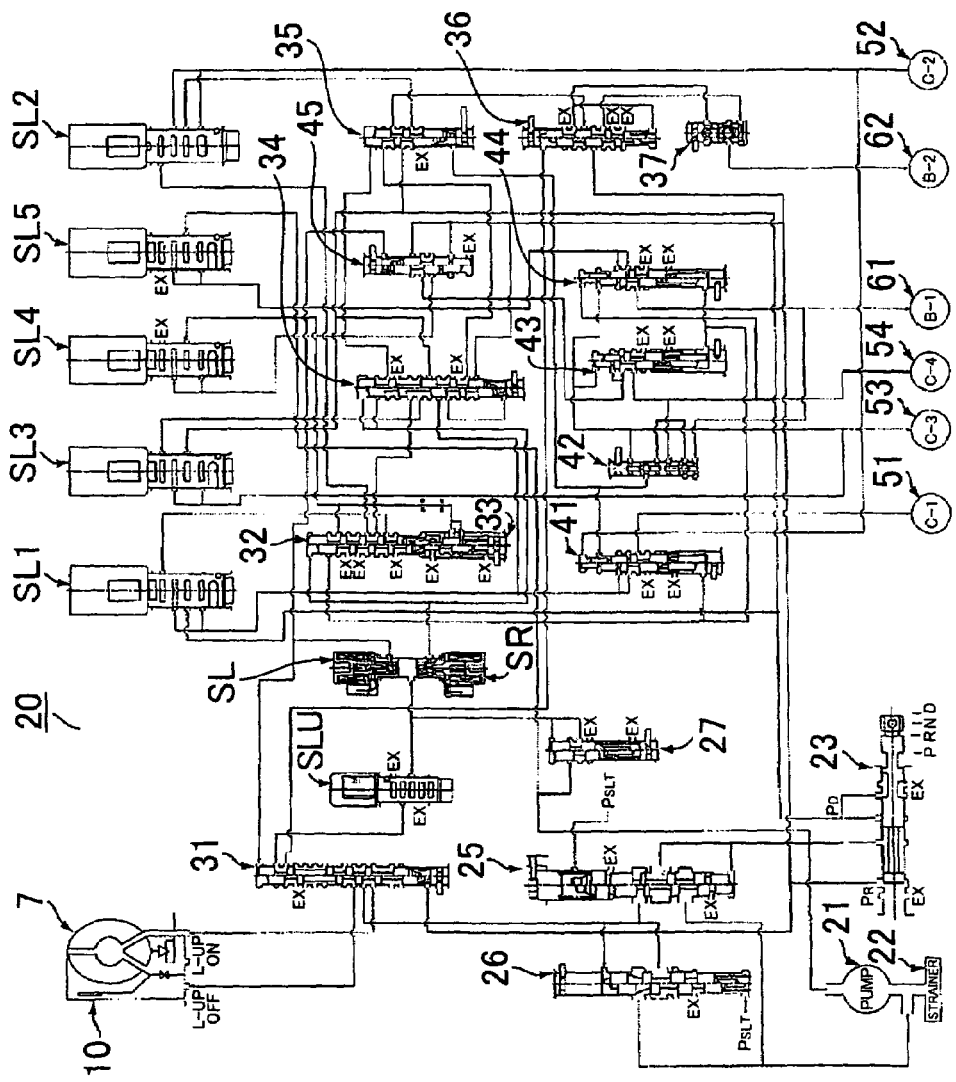
FIG. 4 is a schematic drawing showing the overall hydraulic control apparatus according to an exemplary embodiment of the present invention.

As shown in FIG. 4, generally in order to regulate and generate oil pressures that provide the various types of primary pressures, the hydraulic control apparatus 20 is provided with a strainer 22, an oil pump 21, a manual shift valve (range switching valve) 23, a primary regulator valve 25, a secondary regulator valve 26, a solenoid modulator valve 27, and a linear solenoid valve SLT (not illustrated).

In addition, in order to selectively switch or regulate the oil pressures in each of the oil paths based on the various types of primary pressures, the hydraulic control apparatus 20 is provided with valves whose spool positions are switched and controlled. These valves include a lock-up relay valve (second switching valve) 31, a second clutch apply relay valve (third switching valve) 32, a lock pressure delay valve 33, a first clutch apply relay valve (first switching valve) 34, a B-2 apply control valve (second switching valve) 35, a B-2 control valve 36, a B-2 check valve 37, a first clutch apply control valve 41, a signal check valve 42, a second clutch apply control valve 43, a B-1 apply control valve 44, a C-4 relay valve 45 (first switching valve), and the like.

Furthermore, in order to electrically control and supply oil pressure to each type of relay valve and each type of control valve described above, the hydraulic control apparatus 20 is provided with a linear solenoid valve SL1, a linear solenoid valve SL2, a linear solenoid valve SL3, a linear solenoid valve SL4, a linear solenoid valve SL5, a linear solenoid valve SLU, a solenoid valve SR, and a solenoid valve (fail solenoid valve) SL.

Note that the solenoid valves other than the solenoid valve SR in the hydraulic control apparatus 20, or specifically, the linear solenoid valves SL1 to SL5, SLU, and the solenoid valve SL interrupt the input port and the output port while de-energized (below, referred to as being "off"), and communicate the same while energized (below, referred to as being "on"). In other words, what is termed a normally closed (N/C) type valve is used. In contrast, a normally open (N/O) type valve is used only in the solenoid valve SR.

In addition, the hydraulic control apparatus 20 is provided with a hydraulic servo 51 that can engage and disengage the first clutch C-1, a hydraulic servo 52 that can engage and disengage the second clutch C-2, a hydraulic servo 53 that can engage and disengage the third clutch C-3, a hydraulic servo 54 that can engage and disengage the fourth clutch C-4, a hydraulic servo 61 that can engage and disengage the first brake B-1, and a hydraulic servo 62 that can engage and disengage the second brake B-2. The engagement between the clutches and the hydraulic servos is based on the engagement pressures that are regulated and are supplied by the types of valves described above.

Next, the portions in the hydraulic control apparatus 20 that generate each type of primary pressure described above, that is, the line pressure, secondary pressure, and the modulator pressure, will be explained. Note that the portions that generate the line pressure, the secondary pressure, and the modulator pressure are identical to those of a common hydraulic control apparatus for an automatic transmission, and they are well-known. Thus, the explanation thereof will be brief.

The oil pump 21 generates oil pressure, for example, by being connected to and rotated by the pump impellor 7*a* of the torque converter 7 described above or being connected to and driven by the rotation of the engine, and drawing oil from an oil pan (not illustrated) through the strainer 22. In addition, the hydraulic control apparatus 20 is provided with a linear solenoid valve SLT (not illustrated), and this linear solenoid valve SLT uses the modulator pressure $P_{MOD}$ regulated by the solenoid modulator valve 27 described below as a primary pressure and regulates and outputs a signal pressure $P_{SLT}$ that depends on the throttle opening degree.

The primary regulator valve 25 regulates the oil pressure generated by the oil pump 21 so as to attain a line pressure $P_L$ by discharging a portion thereof based on a signal pressure $P_{SLT}$ of the linear solenoid valve SLT that is input to the spool having applied thereto the urging force of the spring of the primary regulator valve 25. This line pressure $P_L$ is supplied to a manual shift valve 23, a solenoid modulator valve 27, the clutch apply relay valve 32, the linear solenoid valve SL5, the first clutch apply control valve 41, a second clutch apply control valve 43, and a B-1 apply control valve 44, as described below.

In addition, the oil pressure discharged by the primal regulator valve 25 is regulated so as to attain a secondary pressure $P_{SEC}$ by discharging a portion thereof based on the signal pressure $P_{SLT}$ of the linear solenoid valve SLT described above that is input to the spool having the urging force of the spring of the secondary regulator valve 26 applied thereto by the secondary regulator valve 26. This secondary pressure $P_{SEC}$ is supplied to a lubricating oil path and the like (not illustrated), and at the same time is supplied to the lock-up relay valve 31 and used as the primary pressure for the control of the lock-up clutch 10.

In addition, the solenoid modulator valve 27 regulates the line pressure $P_L$, which is regulated by the primary regulator valve 25, so as to attain respectively constant modulator pressures $P_{MOD}$ when the line pressure $P_L$ is equal to or greater than a prescribed pressure due to the urging force of the spring of the solenoid modulator valve 27. These modulator pressures $P_{MOD}$ are supplied as primary pressures to the linear solenoid valve SLT (not illustrated), the solenoid valve LS (normally closed), the solenoid valve SR (normally open), and the linear solenoid valve SLU (normally closed).

Figure 5:
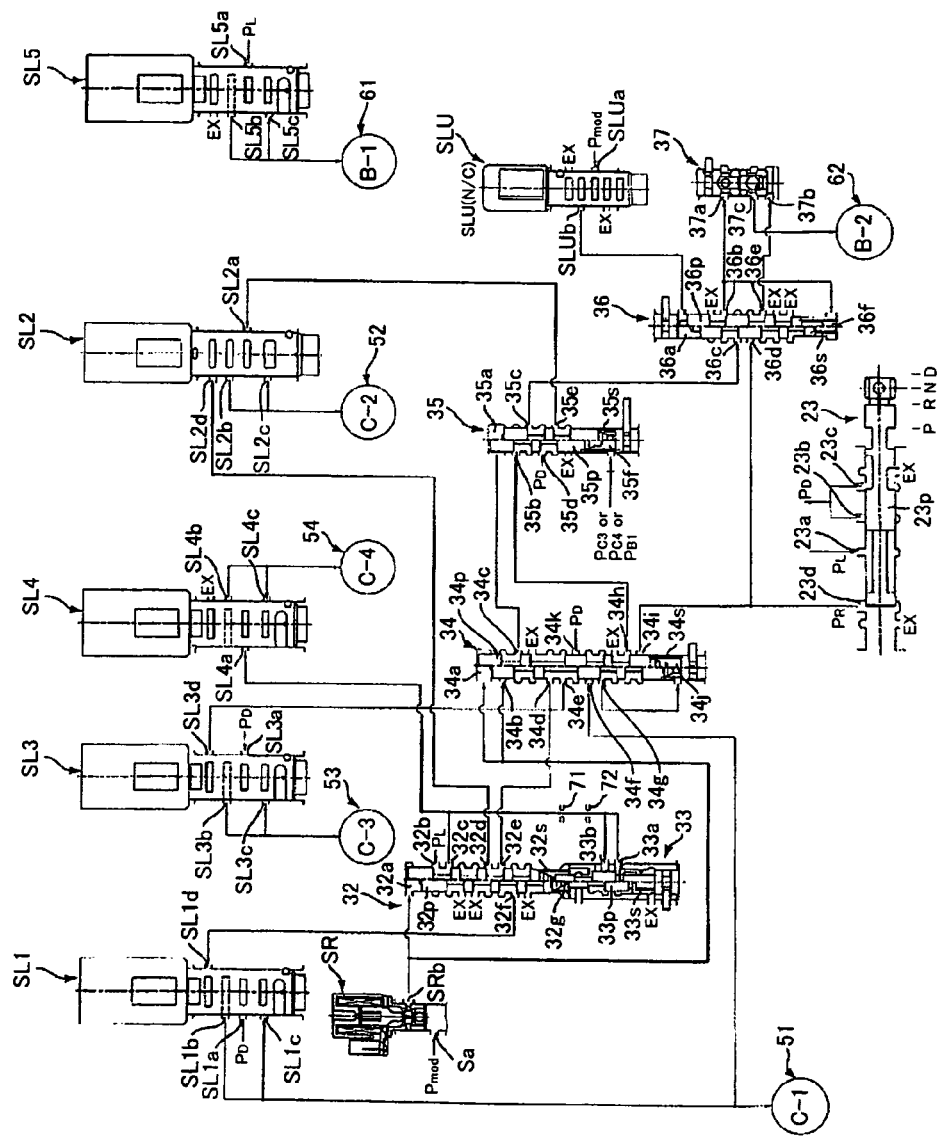
FIG. 5 is a partial diagram showing the forward speed change function portion in the hydraulic control apparatus according to an exemplary embodiment of the present invention.

Configuration of Forward Shifting Function Portion in Hydraulic Control Apparatus Next, the functional portion that mainly carries out the forward shifting control in the hydraulic control apparatus 20 according to an exemplary embodiment of the present invention will be explained with reference to FIG. 5. First, the manual shift valve 23 has a spool 23p that is mechanically (or electrically) driven by a shift lever that is provided at the driver's seat (not illustrated), and the line pressure $P_L$ described above is input to the input port 23a. When the shift position is set to the D (drive) range based on the operation of a shift lever, the input port 23a and the output port 23b communicate based on the position of the spool 23p, and the forward (D) range pressure $P_D$ is output from the output port 23b with the line pressure $P_L$ serving as the primary pressure.

The output ports 23b and 23c are connected to the input port SL1a of the linear solenoid valve SL1, the input port SL3a of the linear solenoid valve SL3, the input port 34k of the first clutch apply relay valve 34, and the input port 35d of the B-2 apply control valve 35, which will be explained in detail below, and when driving in the forward range, the forward range pressure $P_D$ is output to these ports.

In addition, when the shift position is set to the R (reverse) range based on the operation of the shift lever, the input port 23a and the output port 23d communicate based on the position of the spool 23p, and the reverse (R) range pressure $P_R$ is output by the output port 23d, where the line pressure $P_L$ serves as the primary pressure for the reverse (R) range pressure $P_R$.

The output port 23d is connected to the input port 34i of the first clutch apply relay valve 34 and the input port 36d of the B-2 control valve 36, which will be explained in detail below, and while driving in the forward range, the reverse range pressure $P_R$ is output to these ports.

Note that when the P (parking) range or the N (neutral) range (non-traveling range) has been set based on the operation of the shift lever, the input port 23a and the output ports 23b, 23c, and 23d are interrupted by the spool 23p, and thus the range pressure is not output.

The solenoid valve SR inputs a modulator pressure $P_{MOD}$ to the input port Sa (shared with the solenoid valve SL). During normal operation (except during engine braking in the first forward speed described below), the solenoid valve SR becomes energized and does not output a signal pressure $P_{SR}$ from the output port SRb. The solenoid valve SR outputs a signal pressure $P_{SR}$ from the output port SRb while de-energized, for example, during engine braking in the first forward speed or during the all-solenoids-off mode described below (refer to FIG. 2). When the output port SRb is connected to the oil chamber 32a of the second clutch apply relay valve 32, the oil chamber 34a of the first clutch apply relay valve 34, and the input port 34b, and turned off, the signal pressure $P_{SR}$ is output to the oil chamber and the ports, and as will be explained in detail below, when the first clutch apply relay valve 34 is locked at the right half position, the signal pressure $P_{SR}$ is also output to the oil chamber 35a of the B-2 apply control valve 35.

The linear solenoid valve SLU inputs the modulator pressure $P_{MOD}$ to the input port SLUa, and while energized, outputs the signal pressure $P_{SLU}$ from the output port SLUb (refer to FIG. 2). The output port SLUb is connected to the oil chamber 36a of the B-2 control valve 36 via the lock-up relay valve 31, and outputs the signal pressure $P_{SLU}$ to this oil chamber 36a when the lock-up relay valve 31 is in the right half position (refer to FIG. 4 and FIG. 7).

The linear solenoid valve (the second engagement pressure control solenoid valve) SL1 includes an input port SL1a that inputs a forward range pressure $P_D$, an output port SL1b that regulates and outputs the forward range pressure $P_D$ as an engagement pressure (second engagement pressure) $P_{C1}$ to the hydraulic servo (second hydraulic servo) 51 when energized, a feedback port SL1c, and a discharge port SL1d mainly for draining the engagement pressure $P_{C1}$ of the hydraulic servo 51. The discharge port SL1d is connected to a port 32f of the second clutch apply relay valve 32 described below, and during normal operation, the engagement pressure $P_{C1}$ is drained by the drain port EX of the second clutch apply relay valve 32. Note that the output port SL1b is connected to the hydraulic servo 51 via the first clutch apply control valve 41 described below (refer to FIG. 4 and FIG. 6).

The linear solenoid valve SL2 includes an input port SL2a that inputs the forward range pressure $P_D$ via the B-2 apply control valve 35 described below, an output port SL2b that regulates and outputs the forward range pressure $P_D$ to the hydraulic servo 52 as the engagement pressure $P_{C2}$ when energized, a feedback port SL2c, and a discharge port SL2d mainly for discharging the engagement pressure $P_{C2}$ of the hydraulic servo 52. During normal operation, the discharge port SL2d communicates with the port 32d and port 32e of the second clutch apply relay valve 32, the port 34d of the first clutch apply relay valve 34, and the drain port EX, and the engagement pressure $P_{C2}$ is drained by the drain port EX.

The linear solenoid valve SL3 includes an input port SL3a that inputs the forward range pressure $P_D$, an output port SL3b that regulates and outputs the forward range pressure $P_D$ to the hydraulic servo 53 as the engagement pressure $P_{C3}$ when energized, a feedback port SL3c, and a discharge port SL3d mainly for discharging the engagement pressure $P_{C3}$ of the hydraulic servo 53. The discharge port SL3d is connected to the port 34e of the first clutch apply relay valve 34 described below, and during normal operation, the engagement pressure $P_{C3}$ is drained by the drain port EX of the first clutch apply relay valve 34.

The linear solenoid valve (first engagement pressure control valve) SL4 includes an input port SL4a that inputs the line pressure $P_L$ (lock pressure) that is fed through the second clutch apply relay valve 32 to be described below, an output port SL4b that regulates and outputs the line pressure $P_L$ to the hydraulic servo (first hydraulic servo) 54 as the engagement pressure (first engagement pressure) $P_{C4}$ when energized, a feedback port SL4c, and a drain port EX that drains the engagement pressure $P_{C4}$ of the hydraulic servo 54. Note that the output port SL4b is connected to the hydraulic servo 54 via the C-4 relay valve 45 and the second clutch apply control valve 43 (refer to FIG. 4, FIG. 6, and FIG. 7).

The linear solenoid valve (the engagement pressure control solenoid valve) SL5 includes an input port SL5a that inputs the line pressure $P_L$, an output port SL5b that regulates and outputs the line pressure $P_L$ to the hydraulic servo 61 as the engagement pressure $P_{B1}$ when energized, a feedback port SL5c, and a drain port EX that drains the engagement pressure $P_{B1}$ of the hydraulic servo 61. Note that the output port SL5b is connected to the hydraulic servo 61 via the B-1 apply control valve 44, which will be described below (refer to FIG. 4 and FIG. 6).

The B-2 apply control valve 35 includes a spool 35p, a spring 35s that urges the spool 35p upward in the figure, and in addition, above the spool 35p in the figure, includes an oil chamber 35a, an input port 35b, an output port 35c, an input port 35d, an output port 35e, and an oil chamber 35f. The spool 35p of the B-2 apply control valve 35 is set in the right half position when the signal pressure $P_{SR}$ is input to the oil chamber 35a, and otherwise, is set in the left half position due to the urging force of the spring 35s. In addition, the spool 35p is fastened in the left half position irrespective of the input of the signal pressure $P_{SR}$ when any of the engagement pressures $P_{C3}$, $P_{C4}$, and $P_{B1}$ described below is input to the oil chamber 35f.

The forward range pressure $P_D$ is input to the input port 35d and the output port 35e is connected to the input port SL2a of the linear solenoid valve SL2. When the spool 35p is in the left half position, the forward range pressure $P_D$ is output to the linear solenoid valve SL2. In addition, the output port 35c is connected to the input port 36c of the B-2 control valve 36 described below, and when the signal pressure $P_{SR}$ is input to the oil chamber 35a and the spool 35p is at the right half position, the forward range pressure $P_D$ is output to the hydraulic servo 62 via the B-2 control valve 36.

The B-2 control valve 36 includes a spool 36p and a spring 36s that urges this spool 36b upward in the figure, and in addition, above the spool 36p in the figure, includes an oil chamber 36a, an output port 36b, an input port 36c, an input port 36d, an output port 36e, and a feedback oil chamber 36f. The spool 36p of the B-2 apply control valve 36 is controlled so as to move from the right half position to the left half position when the signal pressure $P_{SLU}$ is input to the oil chamber 36a.

When driving in the forward range (the first forward speed during engine braking), the forward range pressure $P_D$ is input to the input port 36c via the B-2 apply control valve 35, and the engagement pressure $P_{B2}$ is regulated and output by the output port 36b based on the signal pressure $P_{SLU}$ of the oil chamber 36a and the feedback pressure of the oil chamber 36f. In addition, while driving in the reverse range, the reverse range pressure $P_R$ is input to the port 36d by the manual shift valve 23, and the engagement pressure $P_{B2}$ is output by the output port 36e.

The B-2 check valve 37 includes an input port 37a, an input port 37b, and an output port 37c, and one of either the oil pressure input to the input port 37a or the input port 37b is output by the output port 37c. Specifically, when the engagement pressure $P_{B2}$ is input to the input port 37a from the output port 36b of the B-2 control valve 36, this engagement pressure $P_{B2}$ is then output to the hydraulic servo 62 from the output port 37c. When the engagement pressure $P_{B2}$ is input to the input port 37b from the output port 36c of the B-2 control valve 36, this engagement pressure $P_{B2}$ is then output to the hydraulic servo 62 from the output port 37c.

The first clutch apply relay valve 34 includes a spool 34 and a spring 34s that urges the spool 34p upward in the figure, and above the spool 34p in the figure, also includes an oil chamber 34a, an input port 34b, an output port 34c, an output port 34d, an output port 34e, an input port 34k, an input port 34f, an output port 34g, and an oil chamber 34j.

In the oil chamber 34a, during normal operation (excluding engine braking in the first forward speed), when the solenoid valve SR is turned on, the signal pressure $P_{SR}$ is not input, and due to the urging force of the spring 34s, the spool 34p is set in the right half position. In addition, when the spool 34p is in the right half position, the engagement pressure $P_{C1}$ is input from the linear solenoid valve SL1 to the input port 34f, the engagement pressure $P_{C1}$ is output to the oil chamber 34j from the output port 34g, and the spool 34p is locked in the right half position.

While the spool 34p is in the right half position, the forward range pressure $P_D$ that is input to the input port 34k and the reverse range pressure $P_R$ that is input to the input port 34i are interrupted. In addition, when the spool 34p is locked in the right half position by the engagement pressure $P_{C1}$, the spool 34p is maintained in the right half position even when the signal pressure $P_{SR}$ is input to the oil chamber 34a, and the signal pressure $P_{SR}$ that is input to the input port 34b is output to the oil chamber 35a of the B-2 apply control valve 35 from the output port 34c. In addition, the output port 34d and the output port 34e are connected to the discharge port SL3d of the linear solenoid valve SL3 and discharge port SL2d of the linear solenoid valve SL2 via the second clutch apply relay valve 32, which will be described below. When the engagement pressure $P_{C3}$ is discharged by the linear solenoid valve SL3 and the engagement pressure $P_{C2}$ is discharged by the linear solenoid valve SL2, the engagement pressure $P_{C3}$ and the engagement pressure $P_{C2}$ are input to and drained by the drain port EX.

In contrast, during the all-solenoids-off mode, which will be described in detail below, the signal pressure $P_{SR}$ is input to the oil chamber 34a, the engagement pressure $P_{C1}$ from the linear solenoid valve SL1 is interrupted, and the spool 34p is set to the left half position. When this spool 34p is in the left half position, in the forward range, the forward range pressure $P_D$ that is input to the input port 34k is output from the output port 34d and the output port 34e, and is then output as fail engagement pressure to the discharge port SL3d of the linear solenoid valve SL3 and the input port 34e of the second clutch apply relay valve 32, which will be explained below. In addition, in the reverse range, the reverse range pressure $P_R$ that is input to the input port 34i is output to the input port 35b of the B-2 apply control valve 35 from the output port 34h, and this reverse range pressure $P_R$ is output to the input port 36c of the B-2 control valve 36 via the B-2 apply control valve 35, which is in the left half position, without the signal pressure $P_{SR}$ being input to the oil chamber 35a. Thereby, as described above, even when the B-2 control valve 36 sticks, locks in the left half position, and the communication between the input port 36d and the output port 36e is interrupted, the reverse range pressure $P_R$ is reliably supplied to the hydraulic servo 62 by the communication between the input ports 36c and 36b.

The second clutch apply relay valve 32 includes a spool 32p, a spring 32s that urges the spool 32p upward in the figure, and above the spool 32p in the figure, also includes an oil chamber 32a, an input port 32b, an output port 32c, an output port 32d, an input port 32e, an input port 32f, and an oil chamber 32g. In addition, a lock pressure delay valve 33, which has a spool 33p that can abut and press against the spool 32p, is integrally provided at the bottom of the second clutch apply relay valve 32. The lock pressure delay valve 33 includes a spool 33p and a spring 33s that urges this spool 33p upward in the figure, and also includes an oil chamber 33a in which the oil pressure acts so as to press the spool 33p downward in the figure and an input port 33b that communicates with the oil chamber 32g of the second clutch apply relay valve 32. In addition, orifices 71 and 72 are provided in the oil duct that connects the output port 32d of the second clutch apply relay valve 32 and the input port 33b of the lock pressure delay valve 33.

During normal operation (and during the all-solenoids-off mode while the engine is starting up as described below), the spool 32p of the second clutch apply relay valve 32 is set at the right half position due to the urging force of the spring 32s and the spring 33s. When the spool 32p is in the right half position, the line pressure $P_L$ that is input to the input port 32b is input to the input port SL4a of the linear solenoid valve SL4 from the output port 32c and to the oil chamber 33a and the input port 33b of the lock pressure delay valve 33, and the lock pressure delay valve 33 is locked in the left half position due to the oil pressure of the oil chamber 33a. As a result, because the oil chamber 33b and the oil chamber 32g communicate, the oil pressure from the oil chamber 33b is supplied to the oil chamber 32g, and the spool 32p is locked in the right half position.

In addition, when this spool 32p is in the right half position, the output port 32f is connected to the discharge port SL1d of the linear solenoid valve SL1, and when the engagement pressure $P_{C1}$ is discharged by this linear solenoid valve SL1, the engagement pressure $P_{C1}$ is input and drained from the drain port EX. Furthermore, the output port 32d is connected to the discharge port SL2d of the linear solenoid valve SL2, and at the same time, the input port 32e is connected to the output ports 34d and 34e of the first clutch apply relay valve 34. When the engagement pressure $P_{C2}$ is discharged from the linear solenoid valve SL2, the engagement pressure $P_{C2}$ is input from the output port 32d and is drained from the drain port EX of the first clutch apply relay valve 34 via the input port 32e.

In contrast, after the engine start-up during the all-solenoids-off mode, which will be described in detail below, the spool 32p is in the left half position, the line pressure $P_L$ that is input to the input port 32b is interrupted, and then the input port 32e and the output port 32f communicate.

Operation of Each Forward Shift Speed

In the hydraulic control apparatus 20 having the functional portions that carry out the forward shift control described above, in the first forward speed while driving in the forward range, the linear solenoid valve SL1 is turned on, the forward range pressure $P_D$ that is input to the input port SL1a is regulated and output to the hydraulic servo 51 as the engagement pressure $P_{C1}$, and the first clutch C-1 is engaged. Thereby, coupled with the locking of the one-way clutch F-1, the first forward speed is attained.

In addition, while using engine braking in the first forward speed, the solenoid valve SR is turned off and the signal pressure $P_{SR}$ is output from the output port SRb. At this time, the second clutch apply relay valve 32 is locked at the right half position by the line pressure $P_L$, and the first clutch apply relay valve 34 is locked at the right half position by the engagement pressure $P_{C1}$. Thus, the signal pressure $P_{SR}$ of the solenoid valve SR is input to the oil chamber 35a of the B-2 apply control valve 35, the forward range pressure $P_D$ of the input port 35b is input to the input port 36c of the B-2 control valve 36 from the output port 35c, and the spool 36p is controlled by the signal pressure $P_{SLU}$ of the linear solenoid valve SLU. Thus, the forward range pressure $P_D$ is regulated and output to the hydraulic servo 62 via the B-2 check valve 37 as engagement pressure $P_{B2}$, and the second brake B-2 is locked. Thereby, coupled with the engagement of the first clutch C-1, the engine brake in the first forward speed is attained.

In the second forward speed, in addition to the linear solenoid valve SL1 being turned on, the linear solenoid valve SL5 is turned on, the line pressure $P_L$ that is input to the input port SL5a is regulated and output to the hydraulic servo 61 as the engagement pressure $P_{B1}$, and the first brake B-1 is engaged. Thereby, coupled with the engagement of the first clutch C-1, the second forward speed is attained.

Note that in the forward range, in the neutral control (N cont) which enhances the fuel economy by releasing the first clutch C-1, control that is similar to that of the second forward speed is carried out, and the linear solenoid valve SL1 regulates the engagement pressure $P_{C1}$ such that the first clutch C-1 remains just prior to engaging (a state in which the rotational play has been reduced). Thereby, the neutral state is set such that, the second forward speed is formed immediately after the neutral control (N cont) is released.

In the third forward speed, in addition to the linear solenoid valve SL1 being turned on, the linear solenoid valve SL3 is turned on, the forward range pressure $P_D$ that is input to the input port SL3a is regulated and output to the hydraulic servo 53 as the engagement pressure $P_{C3}$, and the third clutch C-3 is engaged. Thereby, coupled with the engagement of the first clutch C-1, the third forward speed is attained.

In the fourth forward speed, in addition to the linear solenoid valve SL1 being turned on, the linear solenoid valve SL4 is turned on, the line pressure $P_L$ that is input to the input port SL4a via the second clutch apply relay valve 32 is regulated and output to the hydraulic servo 54 as engagement pressure $P_{C4}$, and the fourth clutch C-4 is engaged. Thereby, coupled with the engagement of the first clutch C-1, the fourth forward speed is attained.

Note that, in the worst case, when the fourth forward speed is not attained, a state may have occurred in which the line pressure $P_L$ is not input to the input port SL4a because the second clutch apply relay valve 32 is stuck in the left half position, and thus the fourth clutch C-4 is not engaged, and the transition to the all-solenoids-off mode to be described below is thereby prohibited.

Specifically, when the spool 32p of the second clutch apply relay valve 32 is in the left half position, in the all-solenoids-off mode to be described below, the forward range pressure $P_D$, which is input to the input port 32e of the second clutch apply relay valve 32 as reverse input pressure, is input to the discharge port SL1d of the linear solenoid valve SL1 from the output port 32f as reverse input pressure, output from the output port SL1b, supplied to the hydraulic servo 51, and thereby the first clutch C-1 is engaged. That is, due to the third forward speed being attained, in this state, when transitioning to the all-solenoids-off mode at a high speed equal to or greater than, for example, the fifth forward speed, downshifting of two or more speeds will occur.

In the fifth forward speed, in addition to the linear solenoid valve SL1 being turned on, the linear solenoid valve SL2 is turned on, the forward range pressure $P_D$, which is input to the input port SL2a via the B-2 apply control valve 35, is regulated and output to the hydraulic servo 52 as the engagement pressure $P_{C2}$, and the second clutch C-2 is engaged. Thereby, coupled with the engagement of the first clutch C-1 described above, the fifth forward speed is attained.

In the sixth forward speed, in addition to the linear solenoid valve SL2 being turned on, the linear solenoid valve SL4 is turned on, the line pressure $P_L$, which is input to the input port SL4a via the second clutch apply relay valve 32, is regulated and output to the hydraulic servo 54 as the engagement pressure $P_{C4}$, and the fourth clutch C-4 is engaged. Thereby, coupled with the engagement of the second clutch C-2 described above, the sixth forward speed is attained.

Note that at this time, similarly, when the sixth forward speed has not been attained, a state may have occurred in which the line pressure $P_L$ is not input to the input port SL4a because the second clutch apply relay valve 32 is stuck in the left half position, and transitioning to the all-solenoids-off mode is prohibited.

Note that similarly while the spool 32p of the second clutch apply relay valve 32 is in the left half position, in the all-solenoids-off mode described below, the forward range pressure $P_D$, which is input to the input port 32e of the second clutch apply relay valve 32 as reverse input pressure, is input to the discharge port SL 1d of the linear solenoid valve SL1 from the output port 32f as reverse input pressure, is then output by the output port SL1b, supplied to the hydraulic servo 51, and the first clutch C-1 is thereby engaged. That is, due to the third forward speed being attained, in this state, when transitioning to the all-solenoids-off mode at a high speed equal to or greater than, for example, the fifth forward speed, downshifting of two or more speeds will occur.

In the seventh forward speed, in addition to the linear solenoid valve SL2 being turned on, the linear solenoid valve SL3 is turned on, the forward range pressure $P_D$, which is input to the input port SL3a, is regulated and output to the hydraulic servo 53 as the engagement pressure $P_{C3}$, and the clutch C-3 is engaged. Thereby, coupled with the engagement of the second clutch C-2 described above, the seventh forward speed is attained.

In the eighth forward speed, in addition to the linear solenoid valve SL2 being turned on, the linear solenoid valve SL5 is turned on, the line pressure $P_L$, which is input to the input port SL5a, is regulated and output to the hydraulic servo 61 as the engagement pressure $P_{B1}$, and the first brake B-1 is engaged. Thereby, coupled with the engagement of the second clutch C-2 described above, the eighth forward speed is attained.

Note that, in the worst case, when the fifth forward speed through the eighth forward speed are not attained, a state may have occurred in which the forward range pressure $P_D$ is not input to the input port SL2a because the B-2 apply control valve 35 is stuck at the right half position, and thus, the second clutch C-2 is not engaged. When such a state has been identified, a fail-safe operation will be carried out.

Figure 6:
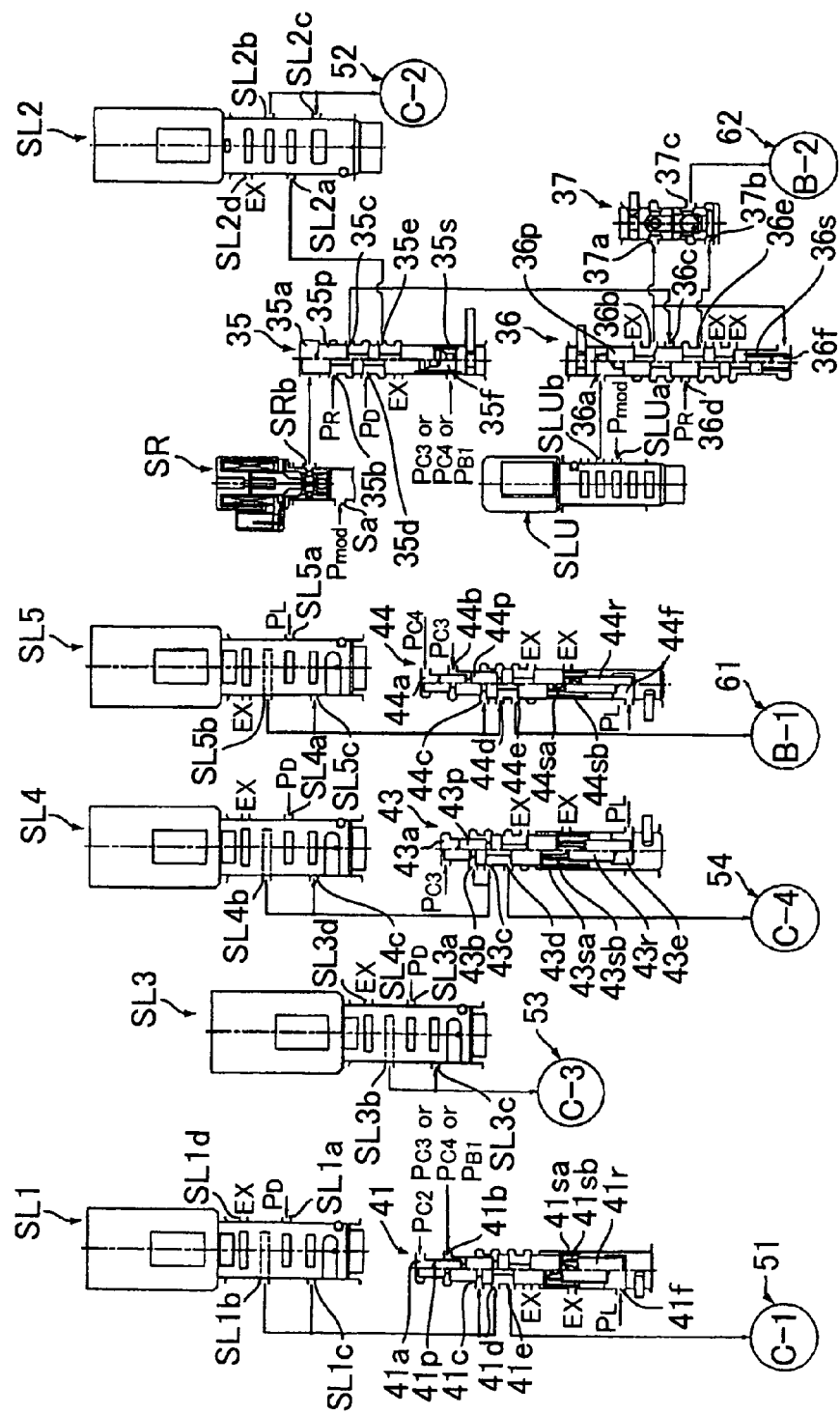
FIG. 6 is a partial diagram showing the simultaneous engagement prevention function portion in the hydraulic control apparatus according to an exemplary embodiment of the present invention.

Configuration of the Simultaneous Engagement Prevention Mechanism Portion in the Hydraulic Control Apparatus Next, the functional portion in the hydraulic control apparatus 20 that mainly carries out the simultaneous engagement prevention will be explained with reference to FIG. 6. A first clutch apply control valve 41 is interposed between the output port SL1b of the linear solenoid valve SL1 and the hydraulic servo 51 as described above. The output port SL3b of the linear solenoid valve SL3 is directly connected to the hydraulic servo 53. A second clutch apply control valve 43 is interposed between the output port SL4b of the linear solenoid valve SL4 and the hydraulic servo 54 as described above. The B-1 apply control valve 44 is interposed between the output port SL5b of the linear solenoid valve SL5 and the hydraulic servo 61 as described above.

In addition, as described above, the B-2 apply control valve 35 and the linear solenoid valve SL3 are interposed between the manual shift valve 23 (refer to FIG. 4 and FIG. 5) and the hydraulic servo 52, and at the same time, the B-2 apply control valve 35, the B-2 control valve 36, and the B-2 check valve 37 are interposed between the manual shift valve 23 and the hydraulic servo 62.

The first clutch apply control valve 41 includes a spool 41p whose land portion is formed such that the diameter thereof gradually becomes larger from the top to the bottom of the figure, a spring 41sa that urges the spool 41p upwards in the figure, a plunger 41r that can abut the spool 41p, and a spring 41sb that is disposed in a compressed state between the spool 41p and the plunger 41r. In addition, in sequence from the above the spool 41p in the figure, the first clutch apply control valve 41 includes an oil chamber 41a, an oil chamber 41b, an oil chamber 41c, an input port 41d, an output port 41e, and an oil chamber 41f.

The engagement pressure $P_{C2}$ that is supplied to the hydraulic servo 52 is input to the oil chamber 41a, and the largest engagement pressure among the $P_{C3}$, $P_{C4}$, and $P_{B1}$ engagement pressures that is supplied to the hydraulic servos 53, 54, and 61 is input to the oil chamber 41b by the signal check valve 42, and furthermore, the engagement pressure $P_{C1}$ to be supplied to the hydraulic servo 51 is input to the oil chamber 41c. In contrast, the line pressure $P_L$ is input to the oil chamber 41f, and coupled with the urging force of the spring 41sa, the spool 41p is urged upward (to the left half position).

Thereby, for example, when the engagement pressure $P_{C1}$ that is input to the oil chamber 41c, the engagement pressure $P_{C2}$ that is input into the oil chamber 41, or any of the engagement pressures $P_{C1}$, $P_{C3}$, and $P_{B1}$ that are input to the oil chamber 41f are simultaneously input, the input port 41d is interrupted due to the line pressure $P_L$ of the oil chamber 41f and the urging force of the spring 41sa being overcome, and the supply of the engagement pressure $P_{C1}$ to the hydraulic servo 51 is stopped. Thus, the simultaneous engagement between the first clutch C-1, the second clutch C-2, and the third clutch C-3, the simultaneous engagement between the first clutch C-1, the second clutch C-2, and the fourth clutch C-4, and the simultaneous engagement between the first clutch C-1, the second clutch C-2, and the first brake B-1 are prevented, and the engagement between the second clutch C-2 and the third clutch C-3, the second clutch C-2 and the fourth clutch C-4, and the second clutch C-2 and the first brake B-1 are permitted.

Note that when no oil pressure is generated because the engine is stopped, because the spring 41sb locks only the plunger 41r in the right half position, during normal operation, the plunger 41r of the first clutch apply control valve 41 being supported in the left half position is prevented, and in cases other than failure, when no oil pressure is generated because the engine has stopped, while operating during a failure, the prevention of an actual hindrance when actually moving to the right half position can be implemented by moving only the plunger 41r to the right half position.

The second clutch apply control valve 43 includes a spool 43p whose land portion is formed such that the diameter thereof gradually becomes larger from the top to the bottom of the figure, a spring 43sa that urges the spool 43p upwards in the figure, a plunger 43r that can abut the spool 43p, and a spring 43sb that is disposed in a compressed state between the spool 43p and the plunger 43r. In addition, in sequence from the above the spool 43p in the figure, the second clutch apply control valve 43 includes an oil chamber 43a, an oil chamber 43b, an input port 43c, an output port 43d, and an oil chamber 43e.

The engagement pressure $P_{C3}$ that is supplied to the hydraulic servo 53 is input to the oil chamber 43a, and the engagement pressure $P_{C4}$ that is supplied to the hydraulic servo 54 is input to the oil chamber 43b. In contrast, the line pressure $P_L$ is input to the oil chamber 43e, and coupled with the urging force of the spring 43sa, the spool 43p is pressed upward (to the left half position).

Thereby, when, for example, the engagement pressure $P_{C4}$ is input to the oil chamber 43b and the engagement pressure $P_{C3}$ is input to the oil chamber 41a simultaneously, the input port 43c is interrupted because the line pressure $P_L$ of the oil chamber 41e and the urging force of the spring 43sa are overcome, the supply of the engagement pressure $P_{C4}$ to the hydraulic servo 54 is stopped, and the simultaneous engagement between the third clutch C-3 and the fourth clutch C-4 is thereby prevented, and the engagement of the third clutch C-3 is thereby permitted.

Note that when no oil pressure is generated because the engine is stopped, the spring 43sb locks only the plunger 43r in the right half position, and thus during normal operation, the plunger 43r of the second clutch apply control valve 43 being maintained continuously in the left half position is prevented. In cases other than failure, when no oil pressure is generated because the engine has stopped, only the plunger 43r is operated in the right half position, and thus while operating during a failure, the prevention of an actual hindrance when actually moving to the right half position can be implemented by moving only the plunger 43r to the right half position.

The B-1 apply control valve 44 includes a spool 44p whose land portion is formed such that the diameter thereof gradually becomes larger from the top to the bottom of the figure, a spring 44sa that urges the spool 44p upward in the figure, a plunger 44r that can abut the spool 44p, and a spring 44sb that is disposed in a compressed state between the spool 44p and the plunger 44r. In addition, in sequence from the above the spool 44p in the figure, the B-1 apply control valve 44 includes an oil chamber 44a, an oil chamber 44b, an oil chamber 44c, an input port 44d, an output port 44e, and an oil chamber 44f.

The engagement pressure $P_{C4}$ that is supplied to the hydraulic servo 54 is input to the oil chamber 44a, the engagement pressure $P_{C3}$ that is supplied to the hydraulic servo 53 is input to the oil chamber 44b, and the engagement pressure $P_{B1}$ that is supplied to the oil chamber 61 is input to the oil chamber 43c. In contrast, the line pressure $P_L$ is input to the oil chamber 44f, and coupled with the urging force of the spring 44sa, the spool 44p is pressed upward (to the left half position).

In the B-1 apply control valve 44, while the engagement pressure $P_{C1}$, which is supplied to the hydraulic servo 61 of the first brake B-1, is input to the oil chamber 44c, the spool 44p and the plunger 44r are in the right half position when one of the engagement pressure $P_{C3}$ of the third clutch C-3 and the engagement pressure $P_{C4}$ of the fourth clutch C-4, which are not simultaneously engaged by the second clutch apply control valve 43, is input to the oil chamber 44a or the oil chamber 44b.

Thereby, when, for example, the engagement pressure $P_{B1}$ is input to the oil chamber 44c, the engagement pressure $P_{C4}$ is input to the oil chamber 44a, or the engagement pressure $P_{C3}$ is input to the oil chamber 44b simultaneously, the input port 44d is interrupted because the line pressure $P_L$ of the oil chamber 44f and the urging force of the spring 44sa are overcome, and the supply of the engagement pressure $P_{B1}$ to the hydraulic servo 61 is stopped. Thus, the simultaneous engagement of the first brake B-1, the third clutch C-3, and the fourth clutch C-4 is prevented, and the engagement of the third clutch C-3 and the fourth clutch C-4 is permitted.

Note that when no oil pressure is generated because the engine is stopped, the spring 44sb locks only the plunger 44r in the right half position, and thus during normal operation, the plunger 44r of the B-1 apply control valve 44 being held continuously in the left half position is prevented. In cases other than failure, when no oil pressure is generated because the engine has stopped, by moving only the plunger 44r to the right half position, the prevention of an actual hindrance when actually moving to the right half position can be implemented while operating during a failure.

The B-2 apply control valve 35 is locked in the left half position when any of the engagement pressures $P_{C3}$, $P_{C4}$, or $P_{B1}$ is input to the oil chamber 35f as described above, irrespective of the input of the signal pressure $P_{SR}$. In addition, when none of the engagement pressure $P_{C3}$, $P_{C4}$, or $P_{B1}$ is input to the oil chamber 35f and the signal pressure $P_{SR}$ of the solenoid valve SR is input, the B-2 apply control valve 35 is set to the right half position because the urging force of the spring 35s is overcome.

Thereby, when any of the engagement pressures $P_{C3}$, $P_{C4}$, or $P_{B1}$ are input to the oil chamber 35f, the forward range pressure $P_D$ is supplied only to the linear solenoid valve SL2, and thus, because the forward range pressure $P_D$ is not supplied to the hydraulic servo 62, the simultaneous engagement of any of the third clutch C-3, the fourth clutch C-4, and the first brake B-1 with the second brake B-2 is prevented. In addition, when the input port 35d and the output port 35e to SL2 are communicating, because the communication between the input port 35d and the output port 35c to the B-2 control valve 36 is interrupted, the simultaneous engagement between the second clutch C-2 and the second brake B-2 is prevented.

As has been described above, the simultaneous engagement of two among the third clutch C-3, the fourth clutch C-4, and the first brake B-1 can be prevented by the second clutch apply control valve 43 and the B-1 apply control valve 44. In addition, the simultaneous engagement of any of the third clutch C-3, the fourth clutch C-4, and the first brake B-1 with the second brake B-2 can be prevented, and the simultaneous engagement between the second clutch C-2 and the second brake B-2 can be prevented by the B-2 apply control valve 35. Furthermore, the simultaneous engagement of any among the third clutch C-3, the fourth clutch C-4, and the first brake B-1 with the second clutch C-2 and the first clutch C-1 is prevented by the first clutch apply control valve 41. Thereby, in the forward range, necessarily only the first clutch C-1 can engage simultaneously with the second brake B-2, while the simultaneous engagement of three friction engagement elements (clutches and brakes) can be reliably prevented.

Operation During All-Solenoids-Off Fail

Next, the all-solenoids-off fail state will be explained with reference to FIG. 5. In the hydraulic control apparatus 20 according to an exemplary embodiment of the present invention for an automatic transmission, excluding the case in which, for example, the sticking of the linear solenoid valve SL4 described above has been detected, when a failure of the other solenoid valves, any of the switching valves, any of the control valves or the like, has been detected, all of the solenoid valves transit to the all-solenoids-off fail mode. Note that, for example, even in the case in which a severed wire or short has occurred, similarly all of the solenoids are set to off, and thus in the present specification, these states are also included in the all-solenoids-off fail mode.

First, during normal operation, even if the engine starts up and the line pressure $P_L$ is generated from the primary regulator valve 25 by actuating the oil pump 21 because the ignition and the solenoid valve SR have been turned on, the signal pressure $P_{SR}$ is not output. Thus, in the second clutch apply relay valve 32, the urging force of the spool 32s and, via the spool 33p, the urging force of the spring 33s, act upward in FIG. 5 on the spool 32p, and the spool 32p is thereby set in the right half position.

At the right half position of this spool 32p, the line pressure $P_L$ input to the input port 32b is output as a lock pressure from the output port 32c to the input port SL4a of the linear solenoid valve SL4, the oil chamber 33a of the lock pressure delay valve 33, and the input port 33b. Thus, the spool 33p of the lock pressure delay valve 33 is pressed downward in FIG. 5 to the left half position, the input port 33b and the oil chamber 32g are communicated, the line pressure $P_L$ is input to the oil chamber 32g as lock pressure, and the spool 32p is locked in the upper position. In this locked state, the engine is stopped, the oil pump 21 is stopped, and the locked state is maintained until the line pressure $P_L$ is no longer generated.

Here, for example, when the all-solenoids-off fail mode occurs due to some cause while a vehicle is traveling in the forward range, in the second clutch apply relay valve 32, all of the solenoid valves are turned off (a failure has occurred) when the spool 32p is locked by the lock pressure based on the line pressure $P_L$. At this time, because all of the solenoid valves are turned off, only the solenoid valve SR, which is a normally open valve, outputs the signal pressure $P_{SR}$, and because the other solenoid valves have stopped the output of the signal pressures and the engagement pressures, in particular, in the linear solenoid valves SL1, SL2, and SL3, the output ports SL1b, SL2b, and SL3b, and the discharge ports SL1d, SL2d, and SL3d are communicated.

In contrast, in the second clutch apply relay valve 32, the signal pressure $P_{SR}$ is input to the oil chamber 32a, but because the line pressure $P_L$ is input to the oil chamber 32g as lock pressure, the spool 32p is maintained locked in the upper position.

Note that in the worst case, even if the lock pressure delay valve 33 is stuck in the left half position in the upper portion of the figure and the line pressure $P_L$ is not input as lock pressure to the oil chamber 32g of the second clutch apply relay valve 32, the spool 33p of the lock pressure delay valve 33 is structured so as to abut the spool 32p of the second clutch apply relay valve 32, and the state in which the spool 32p is similarly thereby locked in the upper position is maintained.

In addition, in the first clutch apply relay valve 34, the signal pressure $P_{SR}$ of the solenoid valve SR is input to the oil chamber 34a, and the spool 34p is set in the left half position because the urging force of the spring 34s is overcome. Thereby, the forward range pressure $P_D$ that is input to the input port 34k is output from the output ports 34d and 34e as a fail engagement pressure, and then is input to the discharge port SL3d of the linear solenoid valve SL3 and the input port 32e of the second clutch apply relay valve 32.

The forward range pressure $P_D$ that has been input to the discharge port SL3d of the linear solenoid valve SL3 as fail engagement pressure is output from the output port SL3b of the linear solenoid valve SL3, is supplied to the hydraulic servo 53, and the third clutch C-3 is thereby engaged. In addition, because the spool 32p is locked in the right half position, the forward range pressure $P_D$, which is input as reverse input pressure to the input port 32e of the second clutch apply relay valve 32, is input to the discharge port SL2d of the linear solenoid valve SL2 from the output port 32d as the reverse input pressure, is then output from the output port SL2b, is supplied to the hydraulic servo 52, and the second clutch C-2 is thereby engaged.

As shown above, in the all-solenoids-off fail mode while the vehicle is traveling in the forward range, the seventh forward speed, in which the second clutch C-2 and the third clutch C-3 have been engaged, is set.

In contrast, subsequently, for example, when the vehicle is temporarily stopped and the engine is stopped, the line pressure $P_L$ is no longer generated, and in the second clutch apply relay valve 32 and the lock pressure delay valve 33, both the spool 32p and the spool 33p are set in the right half position due to the urging pressure of the spring 32s and the spring 33s. In addition, subsequent to this, when the engine is restarted, the oil pump 21 is actuated and line pressure $P_L$ is thereby generated, but because the solenoid valve SR is turned off and the signal pressure $P_{SR}$ is input to the oil chamber 32a, the signal pressure $P_{SR}$ acts downward in the figure against the urging force of the spring 32s and the urging force of the spring 33s, and the spool 32p is switched to the left half position. Thereby, the line pressure $P_L$ is not output from the output port 32c because the input port 32b is interrupted, and the line pressure $P_L$ is not input to the oil chamber 32g as lock pressure.

In addition, in this case, even if, for example, the line pressure $P_L$ flows from the input port 32b and a small amount of the lock pressure is output from the output port 33c before the spool 32p is switched to the left half position, because the inflow of lock pressure from the orifices 71 and 72 is dampened and time is required for the spool 33p of the lock pressure delay valve 33 to be switched to the left half position, and the input of the lock pressure to the oil chamber 32g is delayed, the signal pressure $P_{SR}$ is input to the oil chamber 32a before the spool 32p is locked in the upper position, and the spool 32p is reliably switched thereby to the lower position.

Note that in the present exemplary embodiment, the case was explained in which the line pressure $P_L$ acted as a lock force on the oil chamber 33a of the lock pressure delay valve 33, but this may be modified such that the forward range pressure $P_D$ will act instead of the lock pressure (i.e. the line pressure $P_L$). In this case, because the engine is restarted and the oil pressure does not act on the oil chamber 33a until the shift position is set in the forward range, inputting the lock pressure to the oil chamber 32g can be delayed more reliably.

In addition, in the second clutch apply relay valve 32, when the spool 32p is switched to the left half position, the forward range pressure $P_D$, which has been output from the output ports 34d and 34e of the first clutch apply relay valve 34 described above and input to the input port 32e, is input as fail engagement pressure to the discharge port SL1d of the linear solenoid valve SL1 from the output port 32f, is output from the output port SL1b, is supplied to the hydraulic servo 51, and the first clutch C-1 is thereby engaged.

As explained above, after the engine has restarted in the all-solenoids-off fail mode, the third forward speed, in which the first clutch C-1 and the third clutch C-3 have been engaged, is set.

Configuration of the Reverse Shifting Function and the Lock-up Function Portions in the Hydraulic Control Apparatus Next, the functional portions that mainly carry out the reverse shifting control and the lock-up control in the present hydraulic control apparatus 20, which are the essential components of an exemplary embodiment of the present invention, will be explained with reference to FIG. 7. Note that the manual shift valve 23, the linear solenoid valve SL4, the B-2 control valve 36, the B-2 check valve 37 and the like have been explained in relation to the forward shift control described above, and thus the explanation thereof has been omitted.

The solenoid valve SL is a normally closed valve, and inputs a modulator pressure $P_{MOD}$ to the input port Sa (also used by the solenoid valve SR described above). The solenoid valve SL is turned on while the vehicle is traveling in reverse and while the lock-up clutch 10 is actuated, and outputs the signal pressure $P_{SL}$ from the output port SLb. The output port SLb is connected to the oil chamber 31a of the lock-up relay valve 31 described below and the oil chamber 45a of the C-4 relay valve 45, and while turned on, outputs the signal pressure $P_{SL}$ to the oil chambers 31a and 45a.

The lock-up relay valve 31 includes a spool 31p and a spring 31s that urges the spool 31p upward in the figure, and above the spool 31p in the figure, includes an oil chamber 31a, an input/output port 31b, an output port 31c, an input port 31d, an input port 31e, an input port 31f, and an oil chamber 31g.

During the disengagement of the lock-up clutch 10 while the vehicle is traveling forward, the signal pressure $P_{SL}$ is not input to the oil chamber 31a because the solenoid valve SL is turned off, and due to the urging force of the spring 31s, the spool 31p is set in the right half position (first position). In addition, when the spool 31p is in the right half position, the signal pressure $P_{SLU}$ is input to the input port 31b from the linear solenoid valve SLU, and the signal pressure $P_{SLU}$ is output to the oil chamber 36a of the B-2 control valve 36 from the output port 31c.

In addition, a secondary pressure $P_{SEC}$, which is regulated by the secondary regulator valve 26 described above, is input to the input port 31e, and when the spool 31p is set in the right half position, the secondary pressure $P_{SEC}$ is output to the lock-up-off port 10a of the torque converter 7 from the input/output port 31d. The secondary pressure $P_{SEC}$ that is input into the torque converter 7 from the port 10a is circulated and discharged from the port 10a, which is also used for lock-up-on, and drained by the drain port (not illustrated) via the input/output port 31f (or supplied to a lubricating fluid path or the like (not illustrated)).

During the engagement of the lock-up clutch 10 while traveling forward, when the solenoid valve SL is tuned on, the signal pressure $P_{SL}$ is input to the oil chamber 31a, and the spool 31p is set in the left half position (second position) because the urging force of the spring 31s is overcome. Thus, the signal pressure $P_{SLU}$ that is input to the input port 31b is interrupted, and at the same time, the secondary pressure $P_{SEC}$ that is input to the input port 31e is output to the lock-up-on port 10b from the input/output port 31f, and the lock-up clutch 10 is engaged by being pressed.

When the vehicle is traveling in reverse, the reverse range pressure $P_R$ is input to the oil chamber 31g from the manual shift valve 23, and the spool 31p of the lock-up relay valve 31 is locked in the right half position. Thereby, even if the signal pressure $P_{SL}$ is input to the oil chamber 31a, the urging force of the spring 31s and the reverse range pressure $P_R$ of the oil chamber 31g are coupled, and the spool 31p is maintained in the right half position.

Figure 7:
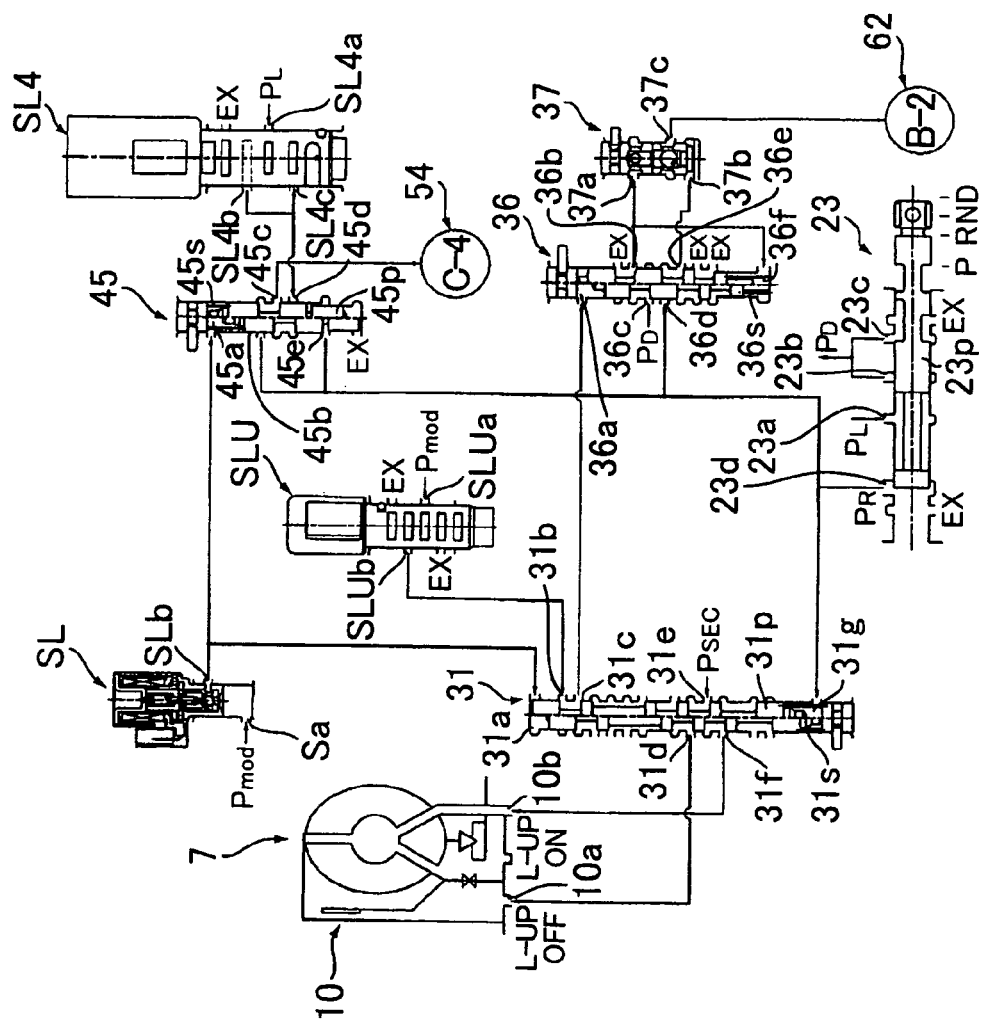
FIG. 7 is a partial diagram showing the reverse speed change function portion in the hydraulic control apparatus according to an exemplary embodiment of the present invention.

The C-4 relay valve 45 includes a spool 45p and a spring (urging device) 45s that urges the spool 45p downward in FIG. 7, and above the spool 45p, the C-4 relay valve 45 further includes an oil chamber 45a, an input port 45b, an output port 45c, an input port 45d, and an oil chamber 45e.

When the vehicle is traveling in the forward range (that is, when the reverse range pressure $P_R$ is not output) and the solenoid valve SL is turned off (that is, while the lock-up clutch 10 is disengaged), the signal pressure $P_{SL}$ is not output to the oil chamber 45a, but the spool 45p is set in the left half position (normal position) because of the urging force of the spring 45s. In addition, when the vehicle is traveling in the forward range, even if the solenoid valve SL is turned on (that is, while the lock-up clutch 10 is engaged) and the signal pressure $P_{SL}$ is input to the oil chamber 45a, coupled with the urging force of the spring 45s, the spool 45p is set in the left half position.

When the spool 45p is in the left half position, the engagement pressure $P_{C4}$ from the linear solenoid valve SL4 is input to the input port 45d and is output to the hydraulic servo 54 from the output port 45c, and thus, in the fourth forward speed and the sixth forward speed, the hydraulic servo 54 is regulated and controlled linearly by the linear solenoid valve SL4.

Next, the control during reverse travel will be explained. In the reverse range during normal operation, the reverse range pressure $P_R$ is output from the output port 23d of the manual shift valve 23. Thus, in the C-4 relay valve 45, the reverse range pressure $P_R$ is input to the oil chamber 45e, but the solenoid valve SL is turned on, the signal pressure $P_{SL}$ is input to the oil chamber 45a, and coupled with the urging force of the spring 45s, the spool 45p is set in the left half position. Thereby, even during reverse travel, the engagement pressure $P_{C4}$ from the linear solenoid valve SL4 is output to the hydraulic servo 54.

In addition, in the B-2 control valve 36, because the signal pressure $P_{SLU}$ of the linear solenoid valve SLU is not output, the B-2 control valve 36 is locked in the right half position, and the reverse range pressure $P_R$ that is input to the input port 36d is output as the engagement pressure $P_{B2}$ from the output port 36e. The engagement pressure $P_{B2}$ that is output from the output port 36e is input to the input port 37b of the B-2 check valve 37, and is output by the output port 37c to supply the hydraulic servo 62. Thereby, the fourth clutch C-4 and the second brake B-2 are engaged, and the second reverse speed is attained.

Note that in the reverse range, there are cases where the engagement pressure $P_{B2}$ from the output port 36e is not output due to the B-2 control valve 36 becoming stuck in the left half position. Thus, when the sticking of the B-2 control valve 36 is detected by, for example, the reverse speed not being established, the B-2 control valve 36 is switched to the left half position by turning the solenoid valve SR off and by applying the signal pressure $P_{SR}$ to the first clutch apply relay valve 34, and thereby the reverse range pressure $P_R$ is input to the input port 35b via the port 34i and the port 34h, and the reverse range pressure $P_R$ is output to the B-2 control valve 36 from the output port 35c.

However, the manual shift valve 23 is constructed so as to be connected to a shift lever disposed at the driver's seat via a detent mechanism and a link mechanism (or a shift-by-wire apparatus) that are not illustrated, and the spool 23p is driven in the spool movement direction (linear movement direction) by a linkage to a fan-shaped detent plate, which is rotated by the operation of the shift lever. At the same time, due to the detent lever that urges the detent plate in each shift range position, the manual shift valve 23 does not stop at an intermediate position within these range positions. This detent plate that is rotated has a support axle that is integrally attached at the center of rotation, and an angle sensor that detects the angle of rotation of the support axle is provided on the end of this support axle. Specifically, this angle sensor detects the angle of the detent plate, that is, it can detect the spool position of the manual shift valve 23 that is driven by the linkage to the detent plate.

Based on the detection of this angle sensor (below, referred to simply as a "spool position sensor" to facilitate understanding), when detecting that the vehicle has switched from the non-travel range (specifically, the parking range and the neutral range) to the forward range, forward start control is carried out in which, for example, the linear solenoid valve SL1 is turned on by the electronic control unit (for example, an ECU) and the first forward speed described above is attained (the second forward speed or the third forward speed may be established). In addition, when a switch from the non-travel range to the reverse range has been detected, reverse start control is carried out in which the solenoid valve SL and the linear solenoid valve SL4 are turned on, and the second forward speed described above is established.

However, as described above, for example, in the case in which the spool position sensor has failed, the shift position (shift range position) cannot be detected, and there is a concern that whether one of the solenoid valves should be turned on cannot be determined. In addition, in the case in which, for example, the shift position cannot be detected, none of the solenoid valves are turned on, which means that engagement pressure is not supplied to any of the hydraulic servos, and thus, the vehicle is in a neutral state in which the drive power from the engine is not transferred to the vehicle wheels via the shift change mechanism 2.

Thus, in the present hydraulic control apparatus according to an exemplary embodiment of the present invention for an automatic transmission, in the case in which the shift position cannot be not detected, forward start control is carried out in which, similar to the first forward speed, the solenoid valve is turned on, that is, only the linear solenoid valve SL1 is turned on. At this time, if the actual shift position is in the forward range, the first forward speed described above is established as explained above, and thus the explanation of the first forward speed is omitted.

In the case in which the shift position cannot be detected and the actual shift position is in the reverse range, because first the linear solenoid valve SL1 is turned on and the forward range pressure $P_D$ is supplied to the input port SL1a of the linear solenoid valve SL1 (refer to FIG. 4 and FIG. 5), the engagement pressure $P_{C1}$ is not supplied to the hydraulic servo 51, and thus, the first clutch C-1 is not engaged.

In contrast, as shown in FIG. 7, in the case in which the solenoid valve SL and the linear solenoid valve SL4 are turned off, after the reverse range pressure $P_R$ has been output from the output port 23b of the manual shift valve 23, it is input to the oil chamber 45e of the C-4 relay valve 45, and because the urging force of the spring 45s is overcome, the spool 45p is set in the right half position (fail position). Thereby, the reverse range pressure $P_R$ that is input to the input port 45b is output from the output port 45c, is supplied to the hydraulic servo 54, and the fourth clutch C-4 is thereby engaged.

In addition, in the B-2 control valve 36, the spool 36b is set in the right half position due to the urging force of the spring 36s, the reverse range pressure $P_R$ that is input to the input port 36d is output from the output port 36e and supplied to the hydraulic servo 62 via the B-2 check valve 37, and the second brake B-2 is thereby engaged. Thus, the fourth clutch C-4 and the second brake B-2 are engaged, and the second reverse speed is attained.

In this manner, even in the case in which, for example, the shift position cannot be detected, in an exemplary embodiment of the present invention, the hydraulic control apparatus 20 for an automatic transmission, due to the actual spool position in the manual shift valve 23, the first reverse speed and the second reverse speed can be established.

Note that in the present exemplary embodiment, the case was explained in which the spool position sensor fails and the linear solenoid valve SL4 and the solenoid valve SL are turned off (de-energized) due to carrying out forward start control irrespective of the shift position. However, during the all-solenoids-off fail mode described above, the case is the same, that is, even when the linear solenoid valve SL4 and the solenoid valve SL are turned off due to the all-solenoids-off condition, the engagement of the fourth clutch C-4 is enabled due to the reverse range pressure $P_R$.

Outline of the Invention

According to an exemplary embodiment of the present invention as explained above, in the case in which, for example, the C-4 relay valve 45 communicates the engagement pressure $P_{C4}$ from the linear solenoid valve SL4 to the hydraulic servo 54 by being locked in the left half position, which is the normal position, when the signal pressure $P_{SL}$ of the solenoid valve SL is input and the all-solenoids-off fail mode or the shift range position cannot be detected, even in a failure in which the linear solenoid valve SL4 and the solenoid valve SL are de-energized, the reverse range pressure $P_R$ is communicated to the hydraulic servo 54 by being switched to the right half position, which is the fail position, because the reverse range pressure $P_R$ when the manual shift valve 23 is switched to the reverse range position. Thus, during normal operation, by supplying the engagement pressure $P_{C4}$ that is output from the linear solenoid valve SL4 to the hydraulic servo 54, it is possible to regulate the engagement pressure $P_{C4}$ in a linear manner so as not to cause, for example, shift shock, it is possible to smoothly establish the reverse speed, it is possible to establish the reverse speed by supplying the reverse range pressure $P_R$ to the hydraulic servo 54 even during a failure, and it is possible for the vehicle to travel in reverse even during a failure.

In addition, the C-4 relay valve 45 includes a spool 45p that switches to the left half position, which is the normal position, or the right half position, which is the fail position, a spring 45s that urges the spool 45p toward the left half position, which is the normal position, an oil chamber 45a in which the signal pressure $P_{SL}$ of the solenoid valve SL acts on the spool 45p in the direction of the left half position, which is the normal position, and an oil chamber 45e in which the reverse range pressure $P_R$ acts on the spool 45p in the direction of the right half position, which is the fail position. Thus, the C-4 relay valve 45 is locked in the normal position when the signal pressure $P_{SL}$ of the solenoid valve SL is input, and can be switched to the right half position, which is the fail position, by the reverse range pressure $P_R$ during a failure.

Furthermore, the lock-up relay valve 31 is provided that is switched from the right half position to the left half position when the signal pressure $P_{SL}$ of the solenoid valve SL is input and locks in the right half position when the reverse range pressure $P_R$ is input. Thus, while hydraulic control of the lock-up clutch using the solenoid valve SL in the forward range is possible, in the reverse range $P_R$, it is possible to output the signal pressure $P_{SL}$ of the solenoid valve SL in order to establish the reverse speed.

In addition, during a failure in which the range position of the manual shift lever 23 is not detected by the spool position sensor, because forward startup control is carried out, in which the solenoid valve SL1 is energized, when the manual shift valve 23 is in the forward range position, the forward speed is attained and the vehicle can travel forward. In addition, while it is possible that the engagement pressure $P_{C1}$ will not be output from the linear solenoid valve SL1 when the forward range pressure $P_D$ is not output and that this could obstruct attaining the first forward speed, the C-4 relay valve 45 is switched to the right half position, which is the fail position, due to the reverse range pressure $P_R$, it is possible to establish thereby the reverse speed by supplying the reverse range pressure $P_R$ to the hydraulic servo 54, and reverse travel of the vehicle is thereby possible.

Note that in the exemplary embodiment of the present invention explained above, an example was explained in which the hydraulic control apparatus 20 is used in an automatic transmission capable of eight forward speeds and one reverse speed, but of course, this is not limiting, and the present invention can be used in any staged automatic transmission.

In addition, in the present exemplary embodiment, an example was explained in which a lock-up relay valve 31 is used as the second switching valve and the engagement control of the lock-up clutch during forward travel is carried out by the solenoid valve SL, but this is not limiting. The present exemplary embodiment can be applied to any valve in which any type of hydraulic control is carried out by switching a port that inputs and outputs hydraulic pressure during forward travel.

What is claimed is:

1. A hydraulic control apparatus, for an automatic transmission, the automatic transmission establishing a plurality of shift speeds according to an engagement state of a plurality of friction engagement elements that are engaged and disengaged by respective hydraulic servos, and the hydraulic control apparatus, for the automatic transmission, comprises:

a range switching valve that switches between any of a forward range position, a reverse range position, and non-travel positions, outputs a forward range pressure when set to the forward range position, and outputs a reverse range pressure when set to the reverse range position;

a first engagement pressure control solenoid valve that outputs a first engagement pressure to a first hydraulic servo among the respective hydraulic servos of a first friction engagement element among the plurality of friction engagement elements, that engages at least during reverse travel when energized, wherein reverse shift speed is established by energizing the first engagement pressure control solenoid valve when the range switching valve is switched to the reverse range position during normal operation;

a signal pressure output solenoid valve that is energized to output a signal pressure when the range switching valve is switched to the reverse range position during normal operation; and a first switching valve that is interposed between the first engagement pressure control solenoid valve and the first hydraulic servo, and is switched between a normal position that communicates the first engagement pressure to the first hydraulic servo and a fail position that communicates the reverse range pressure to the first hydraulic servo, wherein the first switching valve is locked in the normal position when the signal pressure of the signal pressure output solenoid valve is input, and is switched to the fail position due to the reverse range pressure when the range switching valve switches to the reverse range position during a failure in which the first engagement pressure control solenoid valve and the signal pressure output solenoid valve are de-energized;

wherein the first switching valve comprises a spool that is switched between the normal position and the fail position, an urging device that urges the spool toward the normal position, a first oil chamber in which the signal pressure of the signal pressure output solenoid valve acts on the spool in a direction of the normal position; and a second oil chamber in which the reverse range pressure acts on the spool in the direction of the fail position;

a second switching valve that is switched from a first position to a second position when the signal pressure of the signal pressure output solenoid valve is input and is locked in the first position when the reverse range pressure is input; and wherein the automatic transmission comprises a torque converter that includes a lock-up clutch, and the second switching valve outputs a lock-up clutch engagement pressure in order to engage the lock-up clutch when in the second position.

2. The hydraulic control apparatus, for the automatic transmission, according to claim 1, further comprising:

a range position detecting device that detects a range position of the range switching valve; and a second engagement pressure control solenoid valve that outputs a second engagement pressure to a second hydraulic servo among the respective hydraulic servos of a second friction engagement element among the plurality of friction engagement elements, that engages at least during a forward start when energized, wherein the second engagement pressure control solenoid valve outputs the second engagement pressure based on the forward range pressure, and during normal operation, carries out forward start control in which the second engagement pressure control solenoid valve is energized when a switch from the non-travel range position to the forward range position has been detected in the range switching valve by the range position detecting device, and carries out reverse start control in which the first engagement pressure control solenoid valve and the signal pressure output solenoid valve are energized when a switch from the non-travel range position to the reverse range position has been detected in the range switching valve by the range position detecting device, and carries out forward start control during a failure in which the range position of the range switching valve has not been detected by the range position detecting device.

3. A hydraulic control apparatus, for an automatic transmission, the automatic transmission establishing a plurality of shift speeds according to an engagement state of a plurality of friction engagement elements that are engaged and disengaged by respective hydraulic servos, and the hydraulic control apparatus, for the automatic transmission, comprises:

a range switching valve that switches between any of a forward range position, a reverse range position, and non-travel positions, outputs a forward range pressure when set to the forward range position, and outputs a reverse range pressure when set to the reverse range position;

a first engagement pressure control solenoid valve that outputs a first engagement pressure to a first hydraulic servo among the respective hydraulic servos of a first friction engagement element among the plurality of friction engagement elements, that engages at least during reverse travel when energized, wherein reverse shift speed is established by energizing the first engagement pressure control solenoid valve when the range switching valve is switched to the reverse range position during normal operation;

a signal pressure output solenoid valve that is energized to output a signal pressure when the range switching valve is switched to the reverse range position during normal operation;

a first switching valve that is interposed between the first engagement pressure control solenoid valve and the first hydraulic servo, and is switched between a normal position that communicates the first engagement pressure to the first hydraulic servo and a fail position that communicates the reverse range pressure to the first hydraulic servo, wherein the first switching valve is locked in the normal position when the signal pressure of the signal pressure output solenoid valve is input, and is switched to the fail position due to the reverse range pressure when the range switching valve switches to the reverse range position during a failure in which the first engagement pressure control solenoid valve and the signal pressure output solenoid valve are de-energized;

a range position detecting device that detects a range position of the range switching valve; and a second engagement pressure control solenoid valve that outputs a second engagement pressure to a second hydraulic servo of a second friction engagement element among the plurality of friction engagement elements, that engages at least during a forward start when energized;

wherein the second engagement pressure control solenoid valve outputs the second engagement pressure based on the forward range pressure; and during normal operation, carries out forward start control in which the second engagement pressure control solenoid valve is energized when a switch from the non-travel range position to the forward range position has been detected in the range switching valve by the range position detecting device, and carries out reverse start control in which the first engagement pressure control solenoid valve and the signal pressure output solenoid valve are energized when a switch from the non-travel range position to the reverse range position has been detected in the range switching valve by the range position detecting device, and carries out forward start control during a failure in which the range position of the range switching valve has not been detected by the range position detecting device.

4. The hydraulic control apparatus, for the automatic transmission, according to claim 3, wherein the first switching valve comprises a spool that is switched between the normal position and the fail position, an urging device that urges the spool toward the normal position, a first oil chamber in which the signal pressure of the signal pressure output solenoid valve acts on the spool in a direction of the normal position; and a second oil chamber in which the reverse range pressure acts on the spool in the direction of the fail position.

5. The hydraulic control apparatus, for the automatic transmission, according to claim 3, further comprising:

a second switching valve that is switched from a first position to a second position when the signal pressure of the signal pressure output solenoid valve is input and is locked in the first position when the reverse range pressure is input.

6. The hydraulic control apparatus, for the automatic transmission, according to claim 5, wherein the automatic transmission comprises a torque converter that includes a lock-up clutch, and the second switching valve outputs a lock-up clutch engagement pressure in order to engage the lock-up clutch when in the second position.

* * * * *